United States Patent
Zewail et al.

(10) Patent No.: US 12,185,325 B2
(45) Date of Patent: Dec. 31, 2024

(54) SKIPPING SEMI PERSISTENT SCHEDULING (SPS) OR CONFIGURED GRANT PHYSICAL UPLINK SHARED CHANNEL (CG PUSCH) OCCASIONS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/165,495

(22) Filed: Feb. 2, 2021

(65) Prior Publication Data

US 2022/0248446 A1 Aug. 4, 2022

(51) Int. Cl.
| | | |
|---|---|---|
| *H04W 72/12* | (2023.01) | |
| *H04L 5/00* | (2006.01) | |
| *H04W 72/04* | (2023.01) | |
| *H04W 72/23* | (2023.01) | |

(52) U.S. Cl.
CPC .......... *H04W 72/23* (2023.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 10,993,141 | B2* | 4/2021 | Huang | H04W 28/04 |
| 11,381,298 | B2* | 7/2022 | Zhou | H04B 17/382 |
| 2019/0207662 | A1* | 7/2019 | Zhou | H04W 72/0453 |
| 2019/0320396 | A1* | 10/2019 | Bagheri | H04W 52/34 |
| 2019/0349964 | A1* | 11/2019 | Liou | H04B 7/0626 |
| 2020/0396684 | A1* | 12/2020 | Lin | H04W 72/23 |
| 2021/0105739 | A1* | 4/2021 | Lin | H04L 5/0098 |
| 2021/0185718 | A1* | 6/2021 | Ying | H04W 72/044 |
| 2021/0227570 | A1* | 7/2021 | Park | H04L 1/0061 |
| 2021/0345366 | A1* | 11/2021 | Ying | H04W 72/23 |
| 2022/0085931 | A1* | 3/2022 | Mondal | H04W 72/044 |
| 2022/0248446 | A1* | 8/2022 | Zewail | H04L 5/0048 |
| 2023/0093477 | A1* | 3/2023 | El Hamss | H04L 1/1861 |

* cited by examiner

*Primary Examiner* — Sai Aung
(74) *Attorney, Agent, or Firm* — Patterson & Sheridan, L.L.P.

(57) ABSTRACT

Aspects of the present disclosure relate to wireless communications, and more particularly, to skipping occasions, such as high frequency control packets, for overhead reduction. The control packets may be semi persistent scheduling (SPS) occasions, or configured grant (CG) physical uplink shared control channel (PUSCH). In a general aspect, for example, a user equipment (UE) may receive signaling activating SPS occasions and monitor for downlink control information (DCI) multiplexed in at least some of the SPS occasions. The DCI indicates at least one of the SPS occasions to be skipped from being monitored by the UE. The UE may transmit configured grant (CG) physical uplink shared channel (PUSCH) occasions to a network entity and transmit uplink control information (UCI) multiplexed in at least some of the CG PUSCH occasions. The UCI indicates at least one of the CG PUSCH occasions to be skipped from being monitored by the network entity.

26 Claims, 19 Drawing Sheets

SKIPPING SEMI PERSISTENT SCHEDULING (SPS) OR CONFIGURED GRANT PHYSICAL UPLINK SHARED CHANNEL (CG PUSCH) OCCASIONS

TECHNICAL FIELD

Aspects of the present disclosure relate to wireless communications, and more particularly, to controlling packet transmissions, such as semi-persistent scheduling (SPS) occasions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to techniques that may help a UE save power by taking action to avoid CG transmissions during C-DRX inactive times.

Certain aspects of the present disclosure provide a method for wireless communication by a UE. The method generally includes receiving signaling activating semi-persistently scheduled (SPS) occasions and monitoring for downlink control information (DCI) multiplexed in at least some of the SPS occasions. The DCI indicates at least one of the SPS occasions to be skipped from being monitored by the UE Certain aspects of the present disclosure provide a method for wireless communication by a UE. The method generally includes transmitting configured grant (CG) physical uplink shared channel (PUSCH) occasions to a network entity; and transmitting uplink control information (UCI) multiplexed in at least some of the CG PUSCH occasions, wherein the UCI indicates at least one of the CG PUSCH occasions to be skipped from being monitored by the network entity.

Certain aspects of the present disclosure provide a method for wireless communication by a network entity. The method generally includes transmitting, to a UE, signaling activating semi-persistently scheduled (SPS) occasions; and transmitting downlink control information (DCI) multiplexed in at least some of the SPS occasions. The DCI indicates at least one of the SPS occasions to be skipped from being monitored by the UE.

Certain aspects of the present disclosure provide a method for wireless communication by a network entity. The method generally includes receiving, from a user equipment (UE), in a present configured grant (CG) physical uplink shared channel (PUSCH), an indication of one or more future CG PUSCH occasions to be skipped from being monitored by the network; and scheduling according to the present CG PUSCH.

Aspects generally include UEs, network entities, methods, apparatuses, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
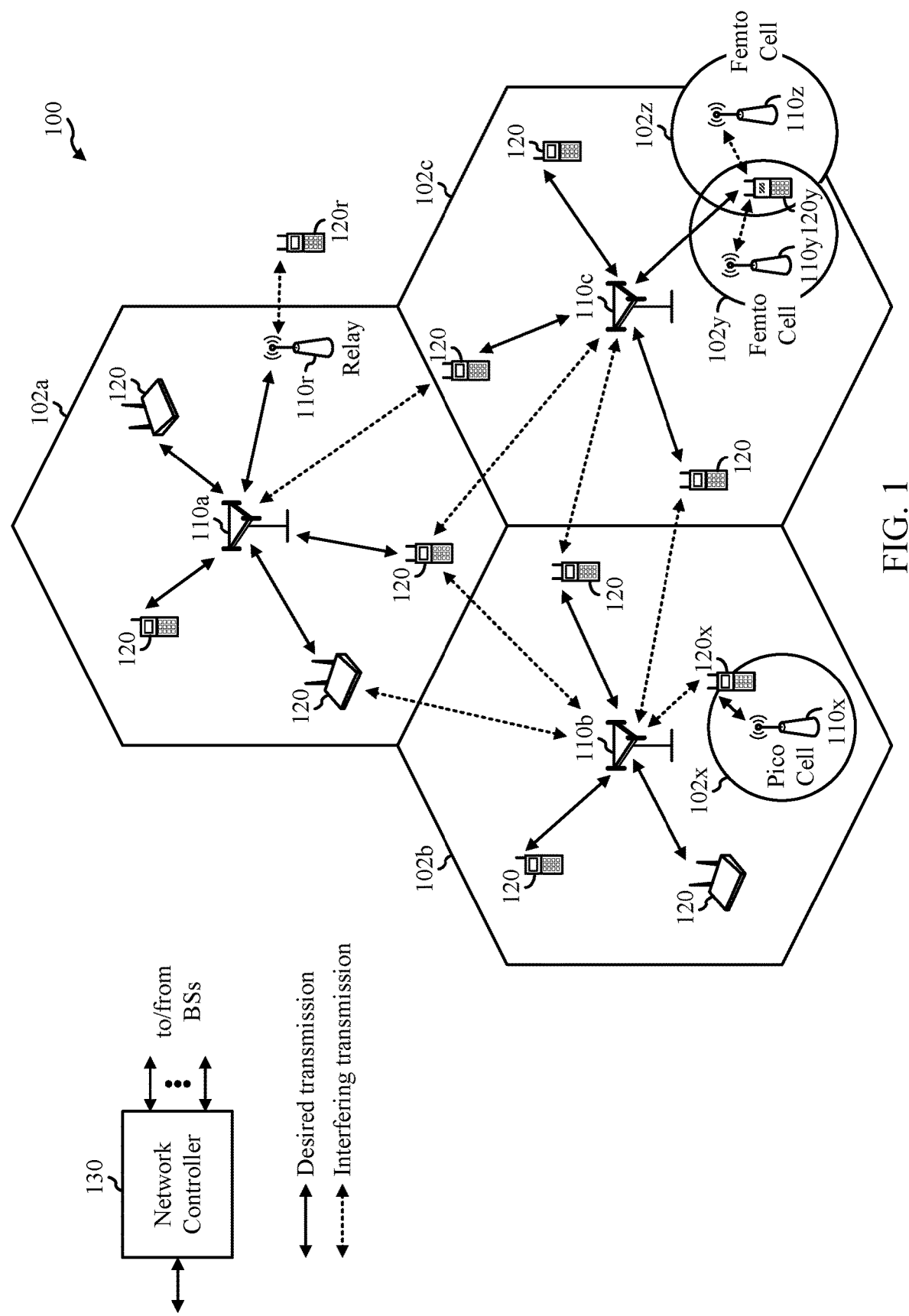
FIG. 1 is a block diagram conceptually illustrating an example telecommunications system, in accordance with certain aspects of the present disclosure.

Aspects of the present disclosure relate to wireless communications, and more particularly, to techniques of skipping occasions, such as high frequency control packets, for overhead reduction. The control packets may be semi persistent scheduling (SPS) occasions, or configured grant (CG) physical uplink shared control channel (PUSCH). In a general aspect, for example, a user equipment (UE) may receive signaling activating SPS occasions and monitor for downlink control information (DCI) multiplexed in at least some of the SPS occasions. The DCI indicates at least one of the SPS occasions to be skipped from being monitored by the UE. The UE may transmit configured grant (CG) physical uplink shared channel (PUSCH) occasions to a network entity and transmit uplink control information (UCI) multiplexed in at least some of the CG PUSCH occasions. The UCI indicates at least one of the CG PUSCH occasions to be skipped from being monitored by the network entity.

In certain aspects, the DCI multiplexed on SPS occasions may explicitly convey the information of SPS skipping. In certain aspects, the DCI may implicitly indicate the information of SPS skipping, such as skipping the SPS occasions between the scheduling physical downlink shared channel (PDSCH) and the scheduled PDSCH. Similarly, in certain aspects, the UCI multiplexed on CG PUSCH occasions may explicitly convey the information of CG PUSCH skipping. In certain aspects, the demodulation reference signal (DMRS) sequence of CG PUSCH may signal to the network entity on skipping one or more of the coming CG PUSCH occasions. In certain aspects, the UE may use a separate physical uplink control channel (PUCCH) or medium access control (MAC) control element (CE) to indicate CG PUSCH skipping explicitly.

For industrial internet-of-things (IoT) applications, many devices needs to be controlled with frequent, but small packets. To save on control overhead, SPS is a natural choice. NR supports SPS downlink (DL) for such control. The existing SPS configurable periodicities are limited to 10, 20, 32, 40, 64, 80, 128, 160, 320, 640 and a few more reserved values (in milliseconds, or ms). For ultra-reliable low-latency communication (URLLC) applications, these periodicity options may not be ideal and smaller values (e.g., sub-slot level) may be preferred. Even if smaller periodicities could be configured, some traffic patterns of IoT devices may not match such limited choices of periodicities. For example, a UE may have a traffic period of 9 ms, which is smaller than the current minimal periodicity of 10 ms. In order to support such a traffic period, the gNB needs to configure SPS with a small periodicity that divides the data traffic period (e.g., 1 ms, 3 ms, if available). Such a small periodicity, even if configured, would imply certain power inefficiency. Therefore, it is desired to have both a flexible small periodicity configuration not limited by the existing limitations, and a configuration to skip some of the unused recurring occasions when such a small periodicity is configured to reduce transmission overhead.

In some cases, extending the DL SPS period to be arbitrary in number of slots may solve part of the issue. However, such solutions may cause other challenges in view of other periodic signaling/monitoring that has fixed set of periods. Furthermore, if arbitrary periods for SPS DL were introduced, collision problems might occur. In addition, for SPS design in NR/LTE, if the PDSCH is not transmitted (i.e., the gNB skips), the UE is still responsible to send a negative acknowledgement (NAK) (naturally fail decoding), thus the control overhead may still be significant.

In some cases, NAK of the SPS may be skipped without PDSCH, such as by sending ACK only feedback. In some cases, signaling is introduced to indicate to the UE that some coming SPS PDSCH transmission will be skipped. The signaling may be MAC CE, included in the activation DCI, or included in the SPS radio resource control (RRC) configuration.

In some cases, the DCI message may be multiplexed on SPS. As such, DCI messages may be configured and/or sent or received in SPS configured occasions. For example, the DCI may be standalone if SPS occasion does not contain PDSCH. Alternatively, the DCI may be multiplexed with PDSCH data if SPS occasion contains PDSCH.

The following description further discusses details of aspects of skipping SPS or CG PUSCH occasions for control overhead reduction.

The present disclosure provide apparatus, methods, processing systems, and computer readable mediums for performing the above aspects in new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

FIG. 1 illustrates an example wireless network 100 in which aspects of the present disclosure may be performed. For example, one or more UEs 120 of the wireless network 100 may be configured to perform operations 900 of FIG. 9 to skip semi persistent scheduling (SPS) occasions indicated in a downlink control information (DCI), or to perform operations 1000 of FIG. 10 to enable a network entity (e.g., the base station 110) to skip configured grant (CG) physical uplink shared channel (PUSCH) occasions in a UCI. Similarly, a base station 110 of the wireless network 100 may be configured to perform operations 1100 of FIG. 10 to have a UE skip at least one of SPS occasions or to perform operations 1200 of FIG. 12 to schedule according to a received CG PUSCH to skip one or more future CG PUSCH occasions.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
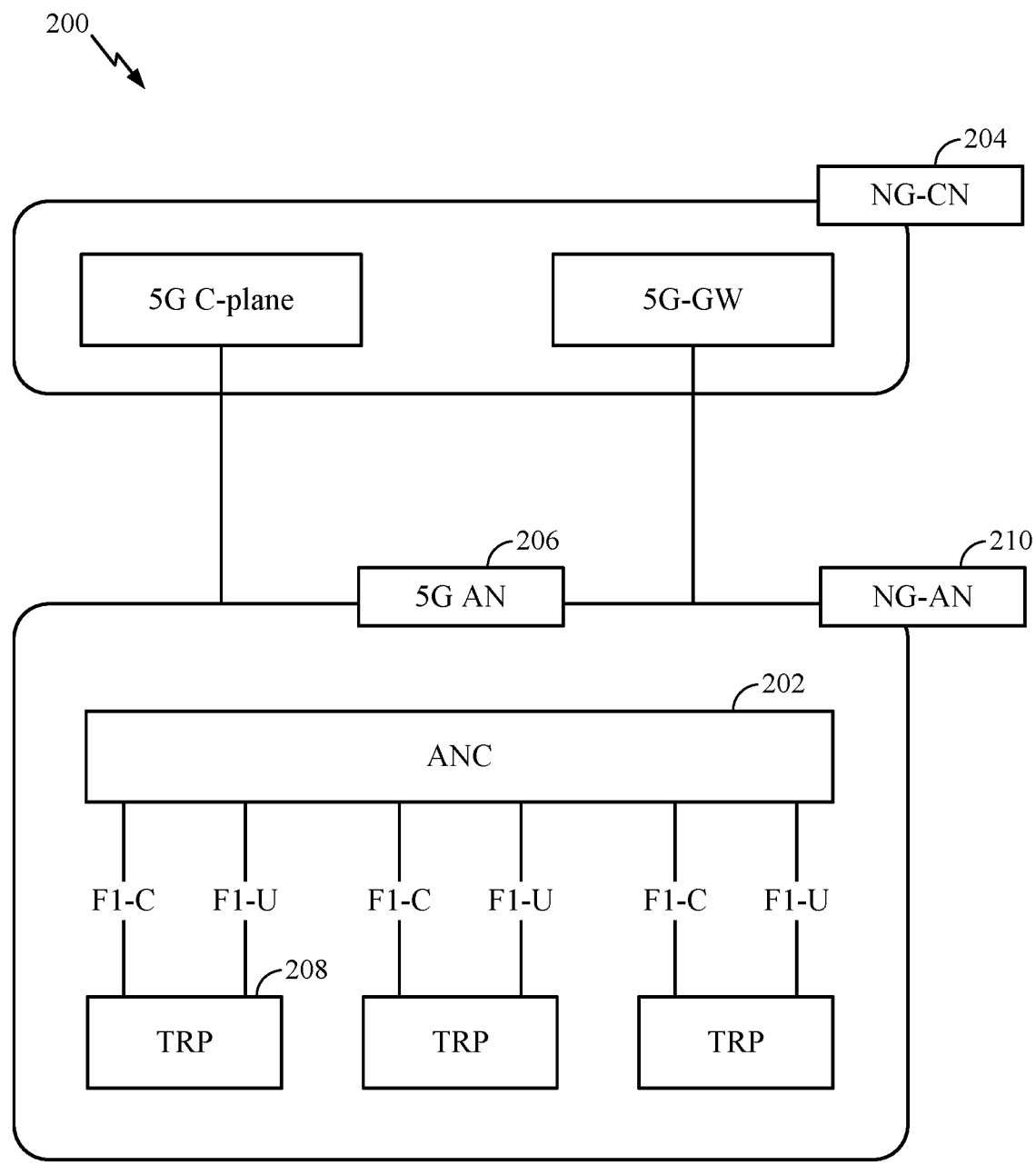
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
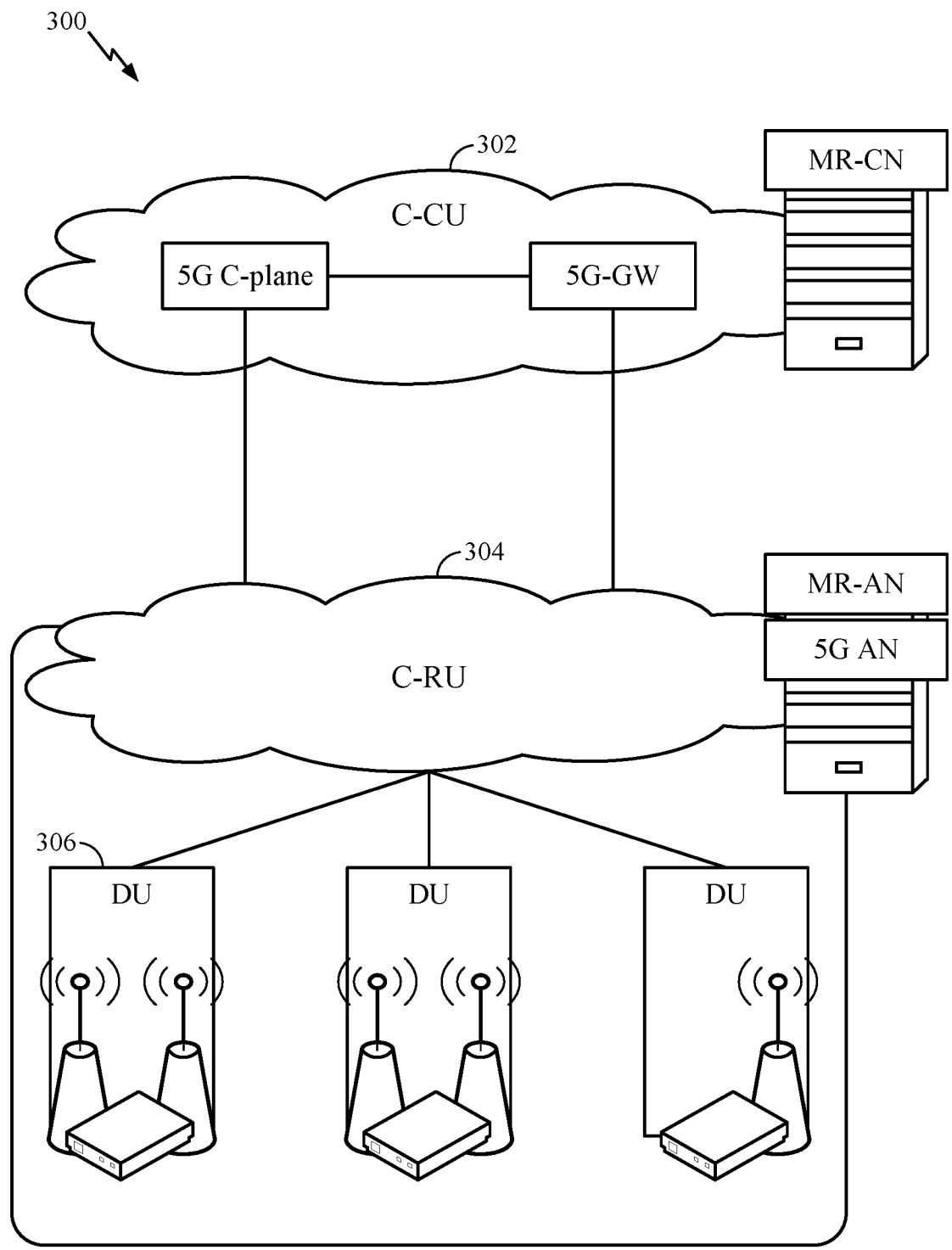
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
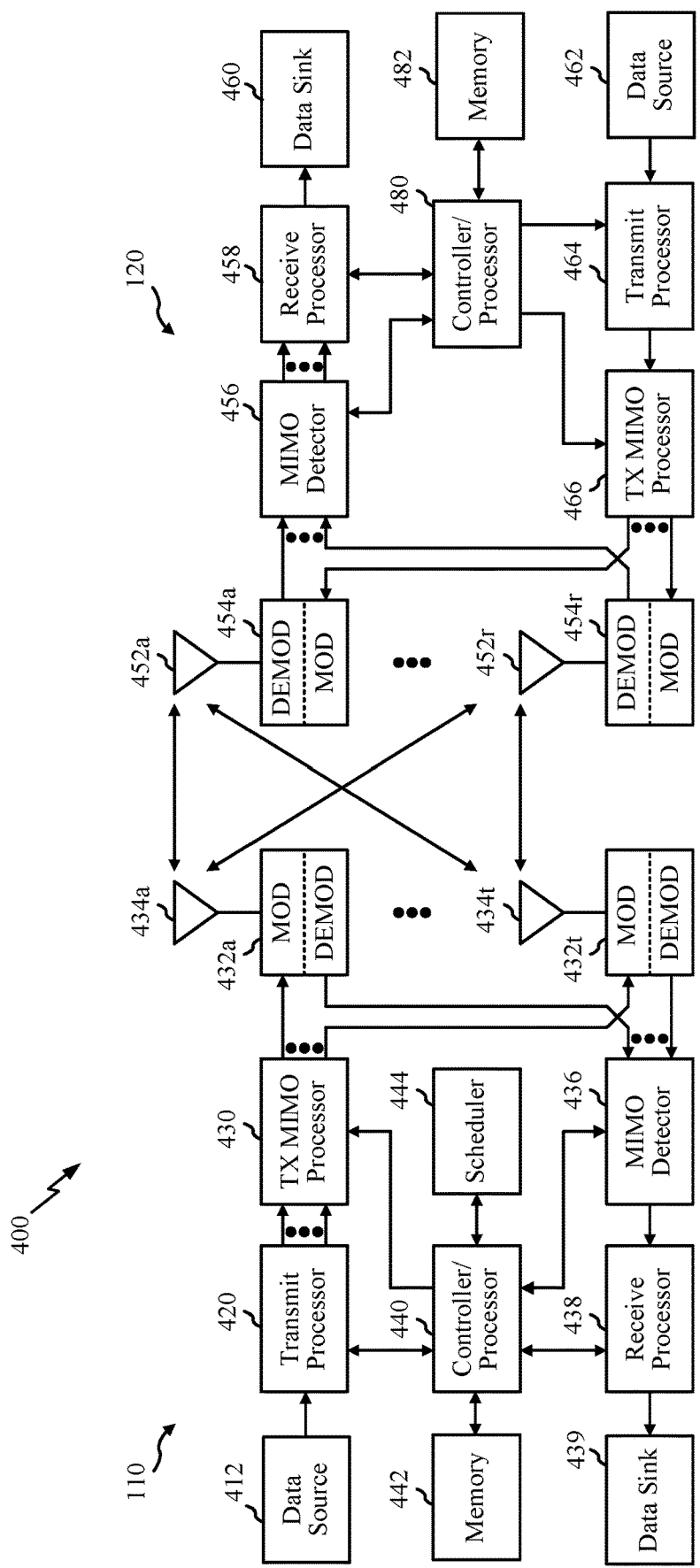
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

Figure 9:
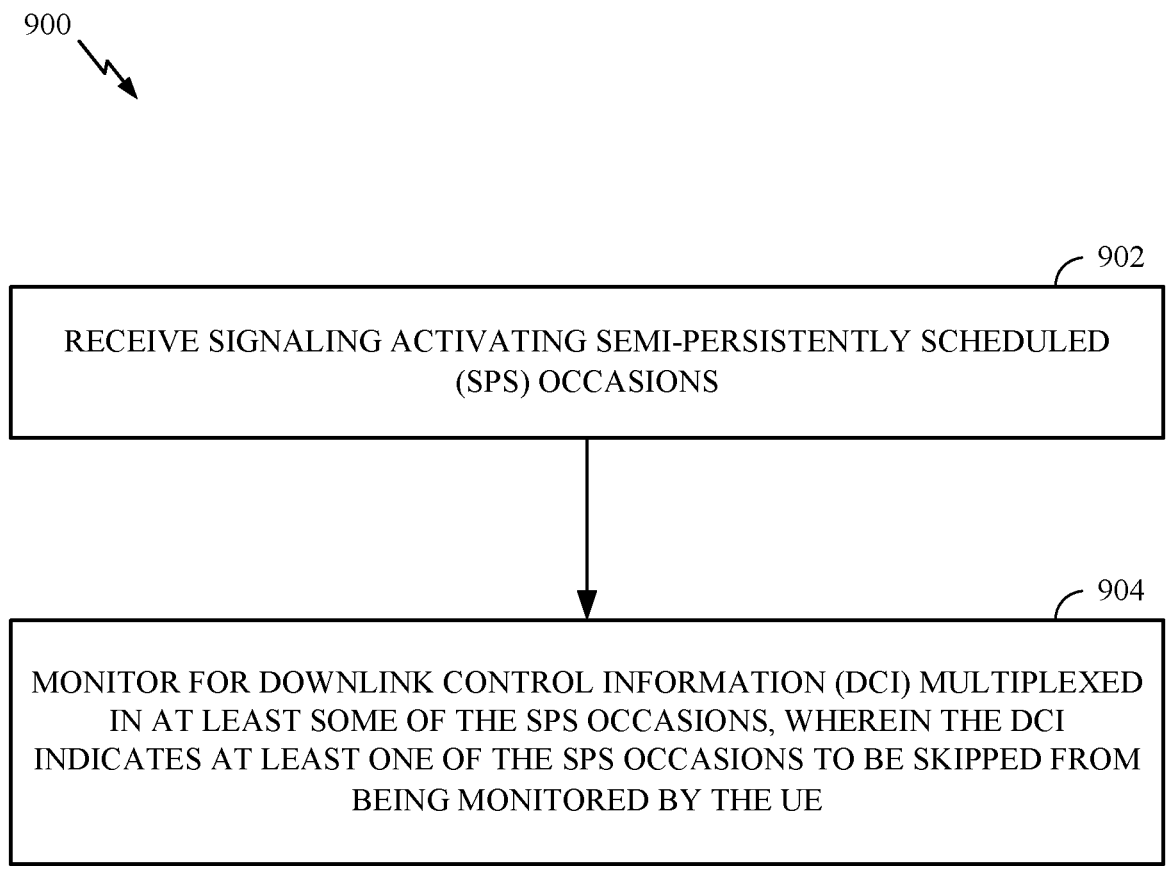
FIG. 9 illustrates example operations that may be performed by a user equipment (UE), in accordance with aspects of the present disclosure.
Figure 10:
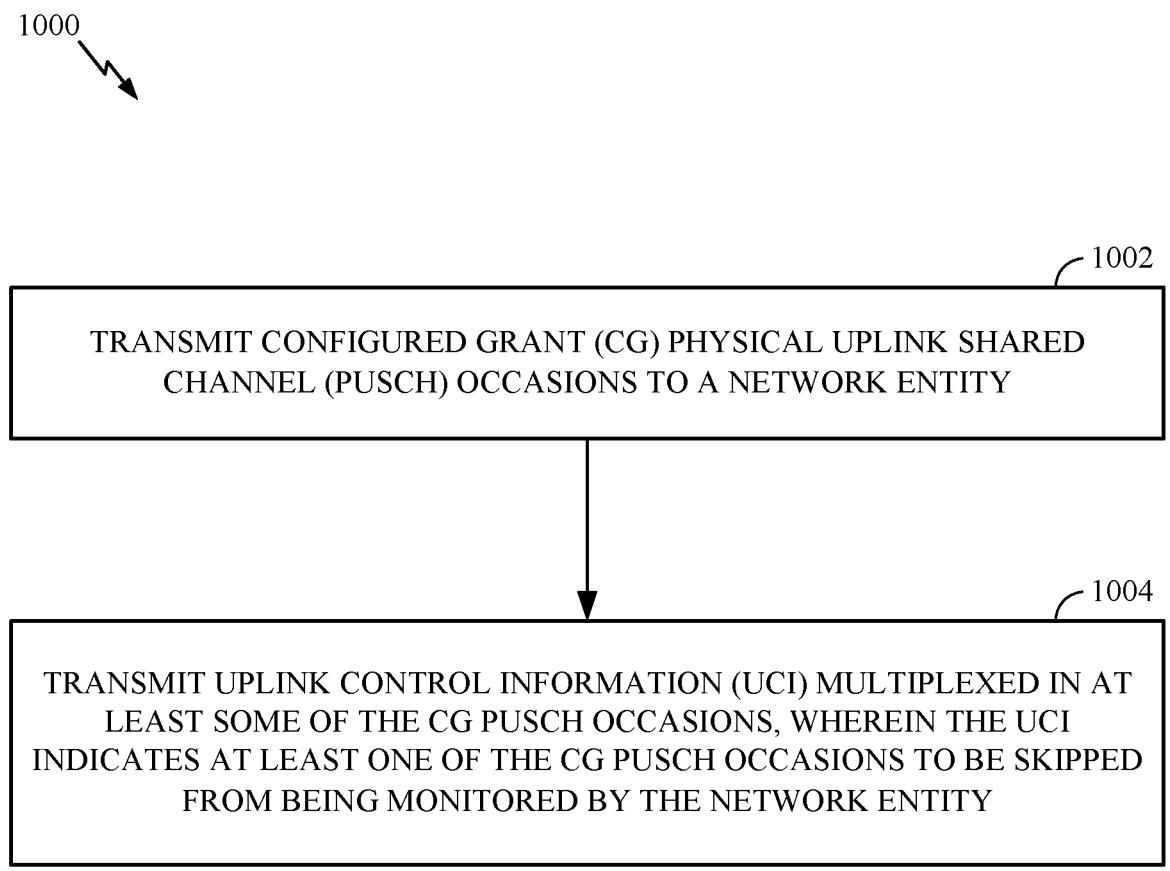
FIG. 10 illustrates example operations that may be performed by a user equipment (UE), in accordance with aspects of the present disclosure.

As an example, one or more of the antennas 452, DEMOD/MOD 454, processors 466, 458, 464, and/or controller/processor 480 of the UE 120 may be configured to perform the operations described herein (e.g., operations 900 of FIG. 9 and 1000 of FIG. 10). Similarly, one or more of the 434, DEMOD/MOD 432, processors 430, 420, 438 and/or controller/processor 440 of the BS 110 may be configured to perform the operations described herein (e.g., operations 1100 of FIG. 11 and operations 1200 of FIG. 12).

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8 and/or other processes for the techniques described herein and those illustrated in the appended drawings. The processor 440 and/or other processors and modules at the BS 110 may perform or direct processes for the techniques described with reference to FIG. 9 and/or other processes for the techniques described herein and those illustrated in the appended drawings. The memories 442 and 482 may store data and program codes for the BS 110 and the UE 120, respectively.

Figure 5:
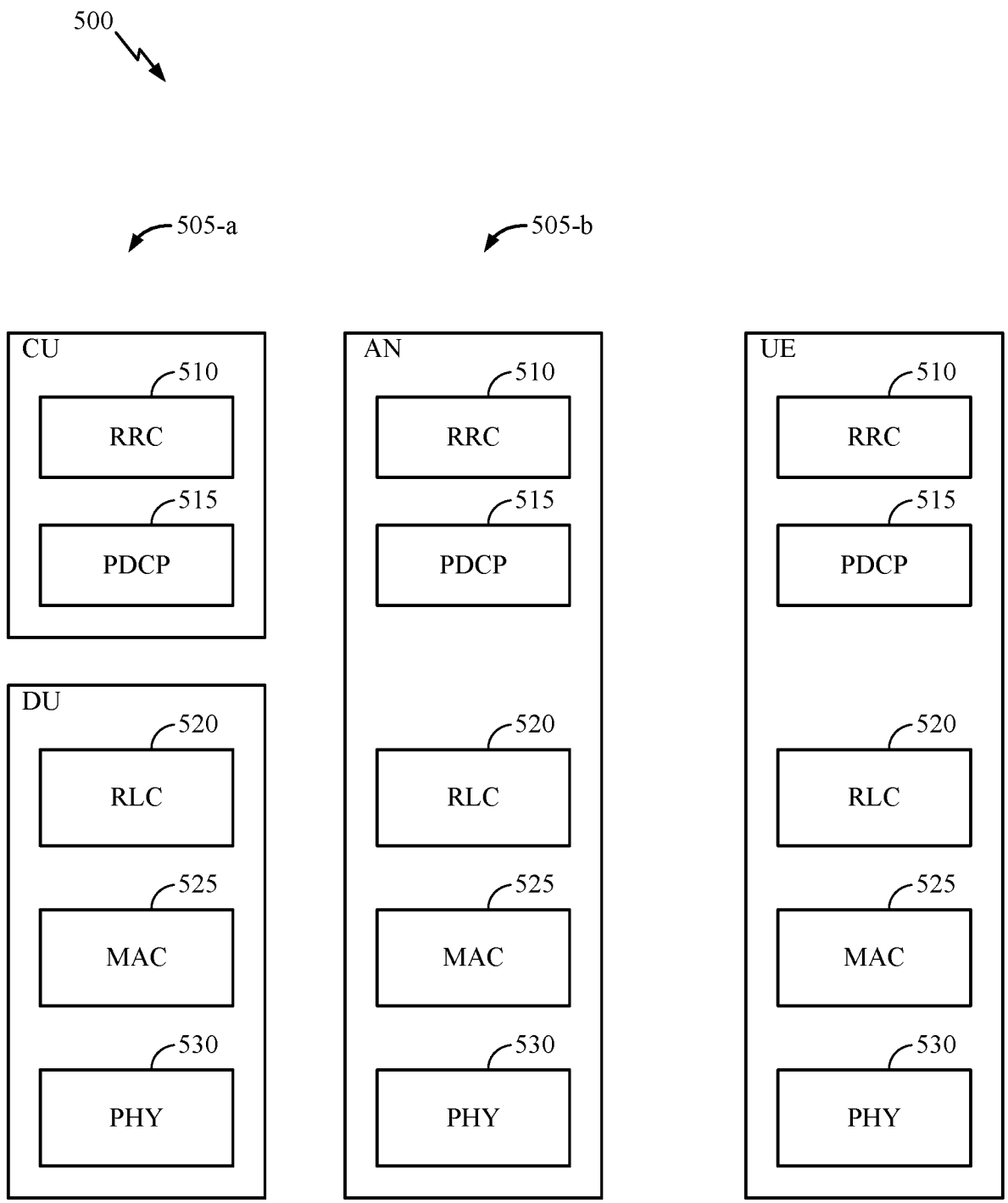
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
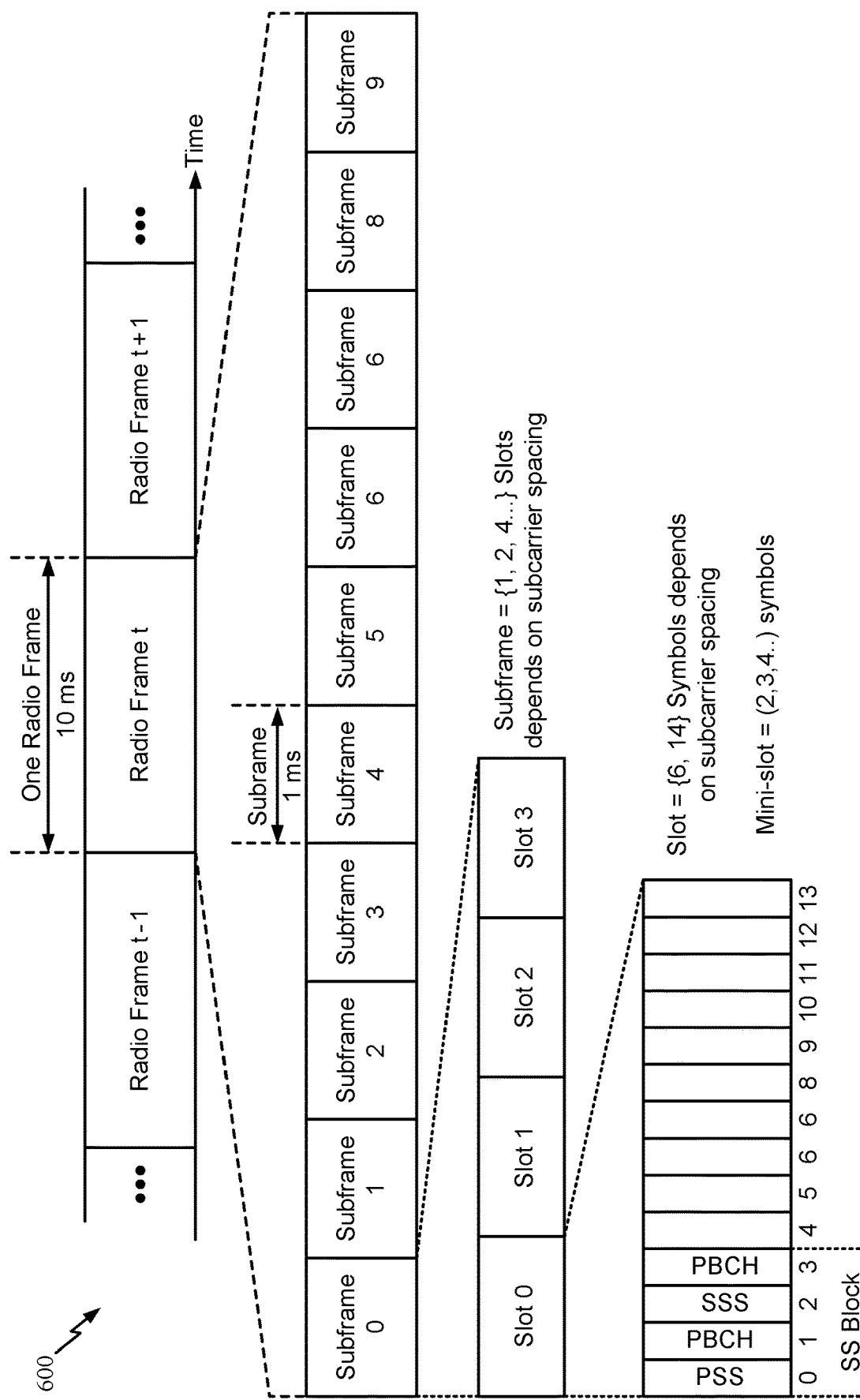
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof.

Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example DCI Multiplexing with SPS

Aspects of the present disclosure relate to wireless communications, and more particularly, to mechanisms allowing downlink control information (DCI) to be multiplexed with semi-persistently scheduled (SPS) occasions configured for PDSCH transmissions to a user equipment (UE).

SPS resource allocation, which is sometimes called configured downlink assignment, refers to a scheduling technique where a user-equipment (UE) is pre-configured by the network/base station (e.g., eNBs, gNB, etc.) with a periodicity and an offset.

Figure 7:
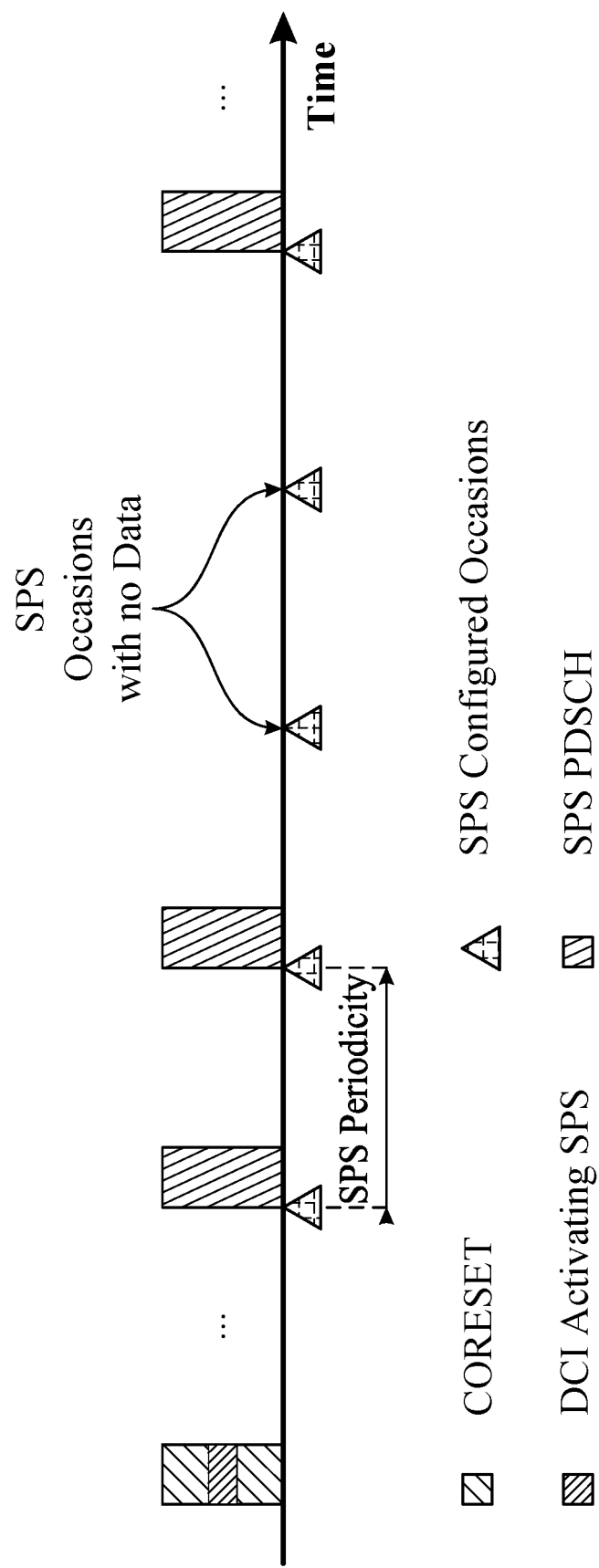
FIG. 7 illustrates an example of semi-persistent scheduled (SPS) PDSCH occasions to be configured using the disclosed skipping techniques, in accordance with certain aspects of the present disclosure.

As illustrated in FIG. 7, once pre-configured, if the UE were to receive an allocation of downlink resources, then the allocation would repeat according to the pre-configured periodicity, resulting in periodic SPS occasions. For SPS, the base station may use Radio Resource Control (RRC) signaling to define the periodicity of configured downlink assignments.

As illustrated in FIG. 7, the base station uses a physical downlink control channel (PDCCH) with downlink control information (DCI) addressed to the configured scheduling radio network temporary identifier (CS-RNTI) of the UE to activate or deactivate a downlink assignment for the UE, and to indicate an offset for SPS. As illustrated, the DCI may be sent in a control resource set (CORESET) monitored by the UE.

Post-activation, a downlink assignment can be implicitly reused according to the periodicity defined by RRC (the SPS configured occasions) without requiring additional signaling (e.g., DCI) until the assignment is deactivated. As illustrated in FIG. 7, data (PDSCH) may or may not be transmitted in each SPS occasion.

Multiplexing DCI in SPS occasions, according to the techniques presented herein, may enhance battery life in reduced capability (NR-lite) UEs, for example, by reducing a number of blind decodes, allowing the UE to efficiently monitor for DCI at times it is already scheduled to be monitoring for PDSCH in configured SPS monitoring occasions. According to the techniques presented herein, the SPS occasions can be configured to "possibly" carry DCI information for the UE multiplexed (piggybacked) with PDSCH during an SPS occasion (if PDSCH is sent on this occasion), or in standalone manner if PDSCH is not sent on this SPS occasion.

Example Reception Beam Conflicts and Skipping Configured Grant PUSCH

Similar to the techniques for skipping SPS occasions described in FIG. 6, the present disclosure further includes techniques for skipping configured grant (CG) PUSCH. Such skipping techniques avoids excessive resource waste. Especially in mmW, due to the analog beam constraint, even if UE does not transmit CG PUSCH, gNB may still need to use or reserve the corresponding beam for potential reception. Such reservation on the corresponding beam may result unnecessary or excessive resource waste. The present disclosure provides techniques for the UE to indicate to gNB on the CG PUSCH occasions where the UE has no data transmission. As a result, the gNB may use different reception (Rx) beam to receive data from other UEs, improving resource utilization efficiency.

Figure 8:
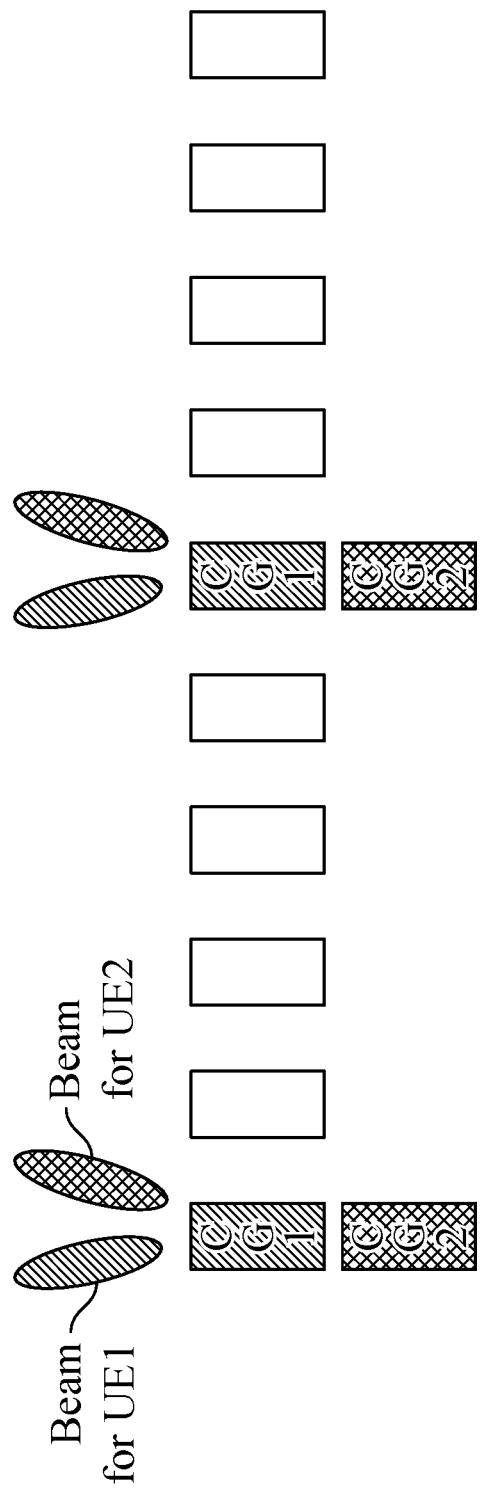
FIG. 8 illustrates an example configured grant uplink transmission conflict to be resolved using the disclosed skipping techniques, in accordance with certain aspects of the present disclosure.

As shown in FIG. 8, the gNB may face reception conflicts between the beam of a first UE and the beam of the second UE: when the gNB needs to receive a first CG PUSCH from UE 1 with beam 1, the gNB may not be able to receive a second CG PUSCH from UE 2 with beam 2 properly. Two cycles of such reception conflicts are shown. The proposed techniques enable the UEs to indicate when a future CG PUSCH may be skipped, in order to free up the Rx beam of the gNB to receive CG PUSCH from another UE (e.g., the second CG1 shown may be skipped to enable reception of the CG2). Details of the techniques are further discussed below.

FIG. 9 illustrates example operations 900 for wireless communications by a UE. Operations 900 may be performed, for example, by a UE 120 (e.g., UE 120) participating in communications with a base station (e.g., a gNB multiplexing DCI with SPS according to operations 1100 of FIG. 11).

Operations 900 begin, at 902, by receiving signaling activating semi-persistently scheduled (SPS) occasions. At 904, the UE monitors for downlink control information (DCI) multiplexed in at least some of the SPS occasions. The DCI indicates at least one of the SPS occasions to be skipped from being monitored by the UE.

FIG. 10 illustrates example operations 1000 for wireless communications by a UE. Operations 1000 may be performed, for example, by a UE 120 (e.g., UE 120) participating in communications with a base station (e.g., a gNB receiving UCI multiplexed with CG PUSCH from the UE according to operations 1200 of FIG. 12).

Operations 1000 begin, at 1002, by transmitting CG PUSCH occasions to a network entity (e.g., a gNB). At 1004, the UE transmits uplink control information (UCI) multiplexed in at least some of the CG PUSCH occasions. The UCI indicates at least one of the CG PUSCH occasions to be skipped from being monitored by the network entity.

Figure 11:
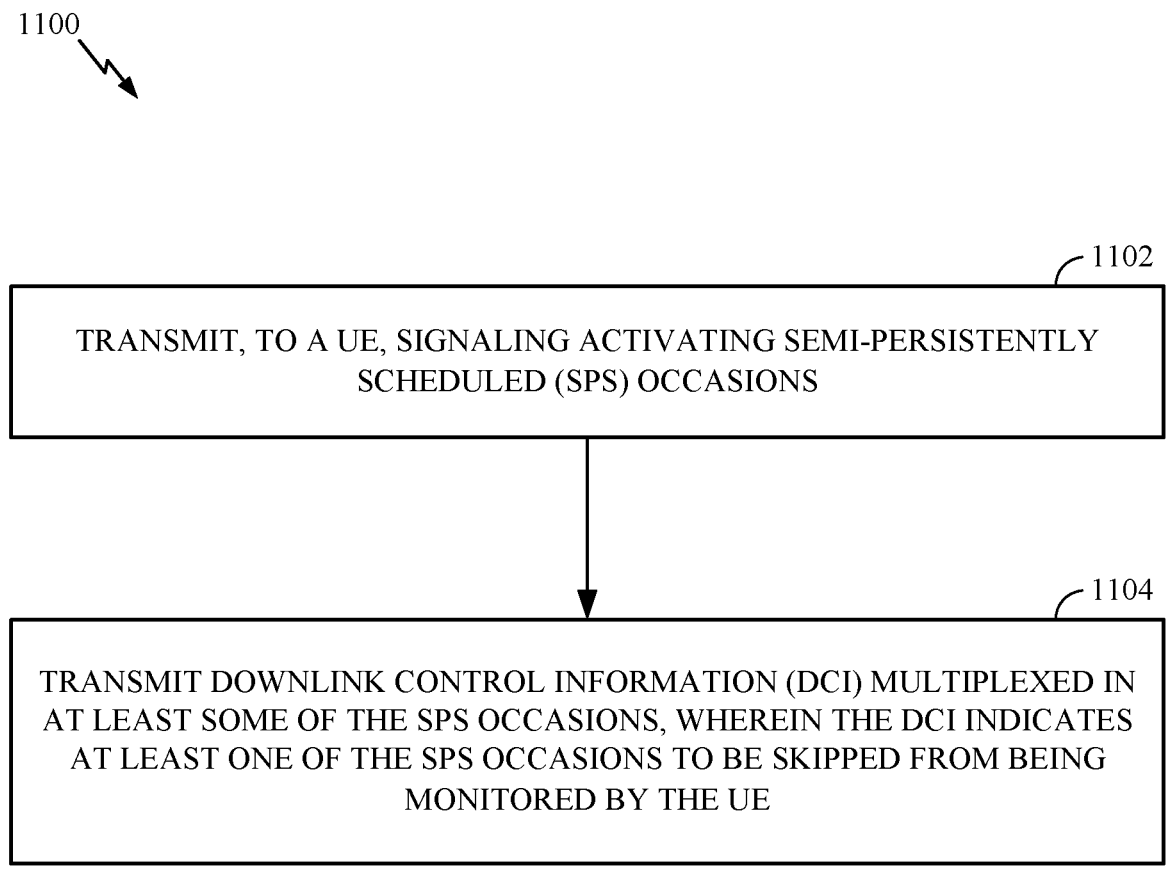
FIG. 11 illustrates example operations that may be performed by a network entity, in accordance with aspects of the present disclosure.

FIG. 11 illustrates example operations 1100 that may be performed by a network entity and may be considered complementary to operations 900 of FIG. 9. For example, operations 1100 may be performed by a gNB to multiplex DCI with SPS occasions configured for a UE (performing operations 900 of FIG. 9).

Operations 1100 begin, at 1102, by transmitting, to a UE, signaling activating semi-persistently scheduled (SPS) occasions. At 1104, the network entity transmits downlink control information (DCI) multiplexed in at least some of the SPS occasions. The DCI indicates at least one of the SPS occasions to be skipped from being monitored by the UE.

Figure 12:
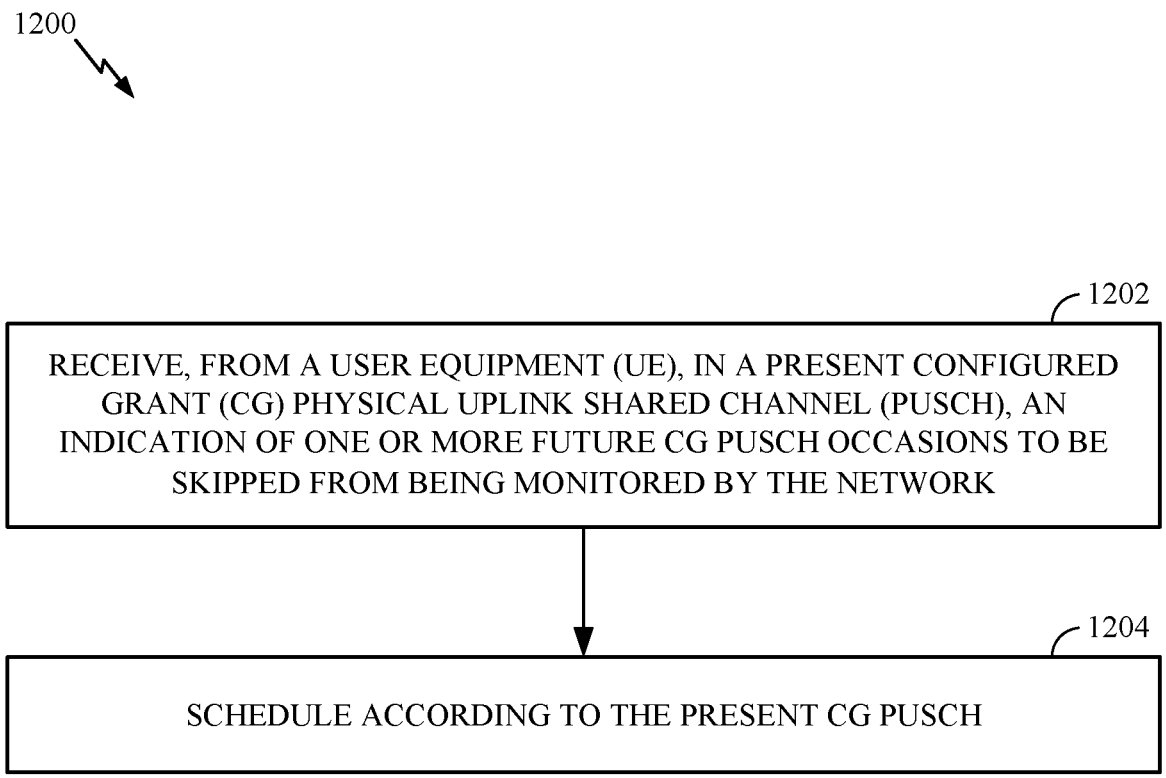
FIG. 12 illustrates example operations that may be performed by a network entity, in accordance with aspects of the present disclosure.

FIG. 12 illustrates example operations 1200 that may be performed by a network entity and may be considered complementary to operations 1000 of FIG. 10. For example, operations 1200 may be performed by a gNB to receive UCI multiplexed with CG PUSCH occasions configured for a UE (performing operations 1000 of FIG. 10).

Operations 1200 begin, at 1202, by receiving, from a UE in a present CG PUSCH, an indication of one or more future CG PUSCH occasions to be skipped from being monitored by the network entity. At 1204, the network entity schedules according to the present CG PUSCH.

Figure 13:
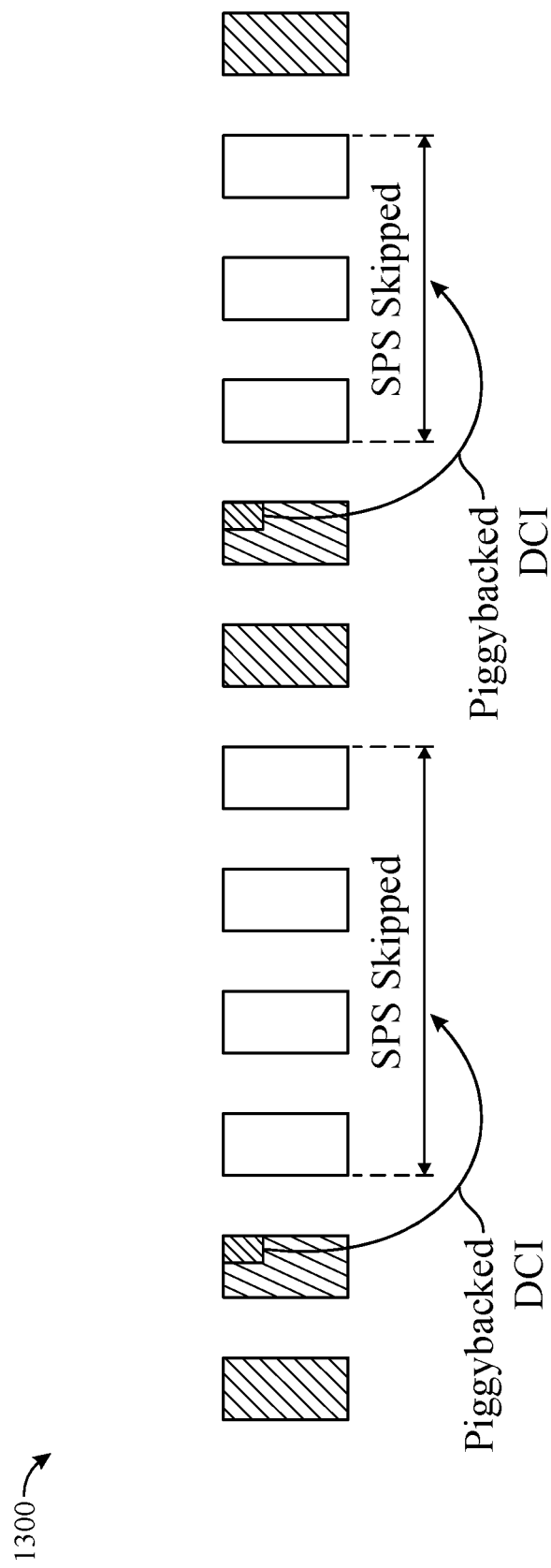
FIG. 13 illustrates an example of explicit indication of skipping semi-persistent scheduled (SPS) occasions using downlink control information (DCI) multiplexed thereon, in accordance with certain aspects of the present disclosure.

Operations 900 and 1100 of FIGS. 9 and 11 may be understood with reference to the transmission timeline shown in FIG. 13, which illustrates an example of explicit indication of skipping SPS occasions using DCI multiplexed thereon. The example assumes a DCI is sent (e.g., in a PDCCH CORESET) that activates the SPS configured for the UE (e.g., configured via RRC signaling).

As illustrated in FIG. 13, the DCI "piggybacked" or multiplexed on an SPS occasion may explicitly convey the information of SPS skipping. The network entity (e.g., the gNB) signals to the UE, via the DCI, that some future SPS occasions will not be used and are to be skipped. As a result, the UE may skip monitoring these occasions, thus saving control overhead. For example, the resources of the skipped SPS occasions and their associated feedback will be available to gNB to assign to other UEs or for different users.

In certain aspects, the DCI can indicate the start location of SPS occasions to be skipped, the number of SPS occasions to be skipped, or both. Such techniques provide flexibility and efficiency advantages, as the indication of SPS skipping may save UE overhead on ACK/NAK reporting as well as SPS monitoring.

Figure 14:
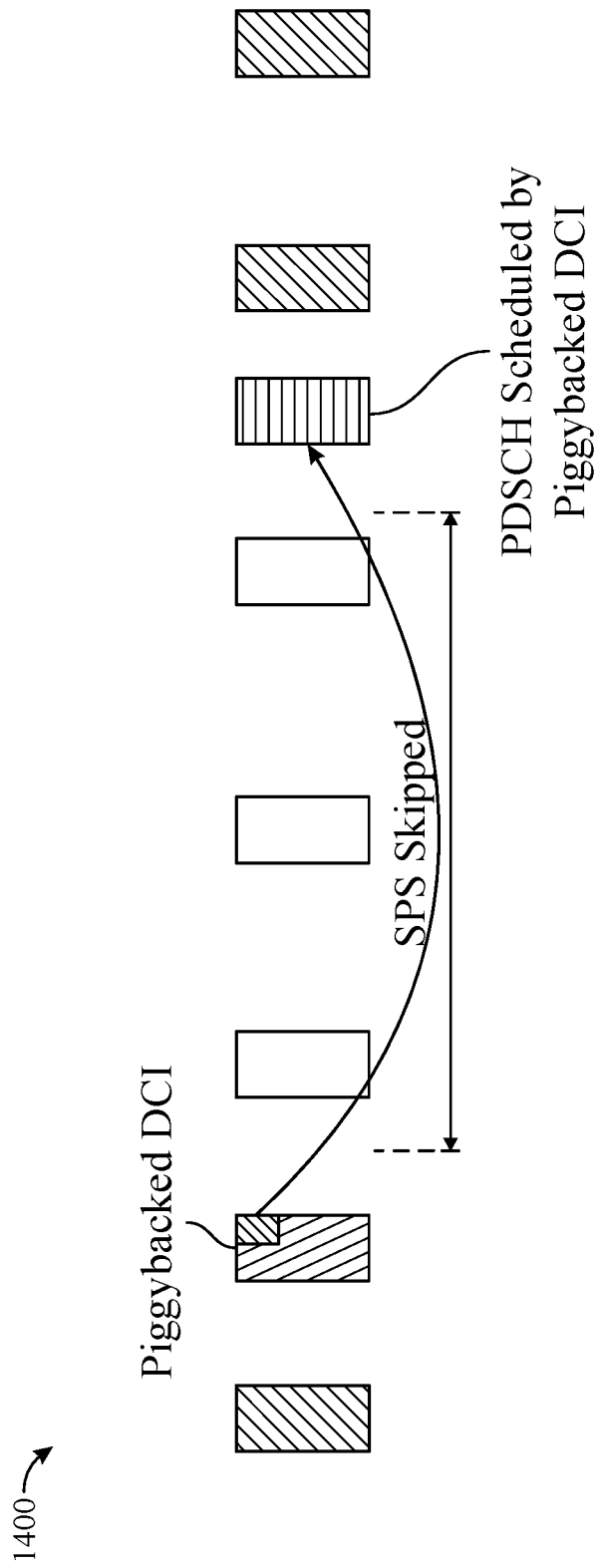
FIG. 14 illustrates an example of implicit indication of skipping SPS occasions using DCI multiplexed thereon, in accordance with certain aspects of the present disclosure.

In certain aspects, operations 900 and 1100 of FIGS. 9 and 11 may be understood with reference to the transmission timeline shown in FIG. 14, which illustrates an example of implicit indication of skipping SPS occasions using DCI multiplexed thereon.

As illustrated in FIG. 14, the piggybacked DCI may indicate implicitly the skipping of the future SPS occasions. For example, if the DCI (e.g., piggybacked in the current PDSCU) schedules a PDSCH, the DCI may indicate at least one SPS occasions to be skipped occurring between transmissions of the current PDSCH and a next scheduled PDSCH. In some cases, the DCI activates the indication of the at least one SPS occasion to be skipped via a radio resource control (RRC) message. In some cases, the DCI activates the indication of the at least one SPS occasion to be skipped via a medium access control (MAC) control element (CE).

This option of implicit indication may be useful for URLLU applications that have short SPS periodicities. For example, as the value of present k0 is 32 slots at maximum, shorter than 10 ms periodicity. The present disclosure supports each of the SPS occasions has a periodicity equal to or less than 10 milliseconds. The DCI indicating the SPS skipping may include a time domain resource allocation parameter associated with the current PDSCH and the periodicity of the each of the SPS occasions.

Figure 15:
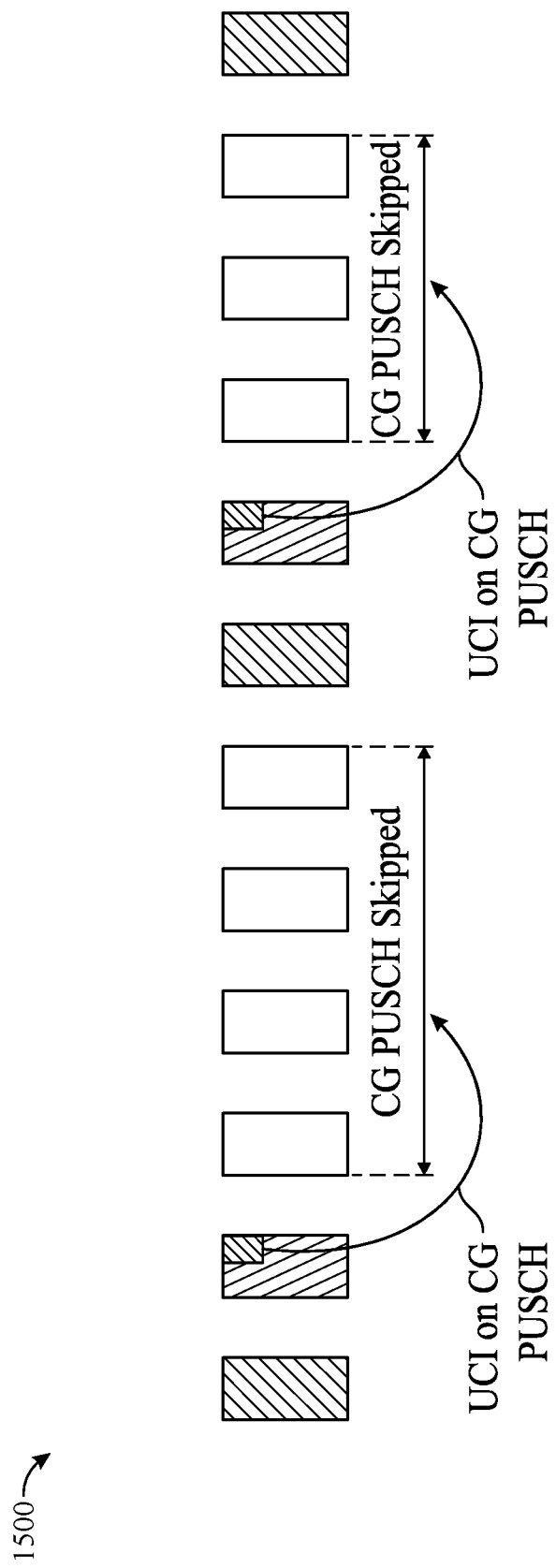
FIG. 15 illustrates an example of indication of skipping configured grant (CG) physical uplink shared channel (PUSCH) occasions using uplink control information (UCI) multiplexed thereon, in accordance with certain aspects of the present disclosure.

Operations 1000 and 1200 of FIGS. 10 and 12 may be understood with reference to the timeline shown in FIG. 15, which illustrates an example of indication of skipping configured grant (CG) physical uplink shared channel (PUSCH) occasions using uplink control information (UCI) multiplexed thereon. For example, the UCI multiplexed on CG PUSCH can be used to explicitly convey the information of CG PUSCH skipping.

As illustrated in FIG. 15, the UE signals to gNB that some CG PUSCH can be skipped, via UCI on CG PUSCH. For example, the UCI is multiplexed on the CG PUSCH. The gNB may use the resources saved from the skipped CG PUSCH occasions to schedule other UEs. More importantly, the gNB may use different beams for other UEs for these skipped CG PUSCH occasions. In certain aspects, the CG PUSCH occasions may be transmitted over unlicensed spectrum, as multiplexing the UCI on PUSCH is allowed. In certain aspects, such as for transmission over licensed spectrum, GC UCI may be similarly introduced for CG PUSCH, such as to enable similar multiplexing.

In certain aspects, for licensed spectrum, the information regarding skipping one or more future CG PUSCH occasions may be carried using other methods. For example, in a first option, the demodulation reference signal (DMRS) sequence of CG PUSCH may be used to signal to gNB on skipping one or more of the coming CG PUSCH. In some cases, the DMRS sequence includes different scrambling patterns. The different scrambling patterns on DMRS sequence may indicate whether UE is transmitting on CG-PUSCH or skipping the current or more upcoming CG-PUSCH.

In certain aspects, the UE may signal explicitly to gNB to skip monitoring the coming CG PUSCH occasions. For example, the explicit indication may be sent in a PUCCH. The explicit indication may also be sent in a MAC CE that indicates the explicit CG-PUSCH skipping.

Figure 16:
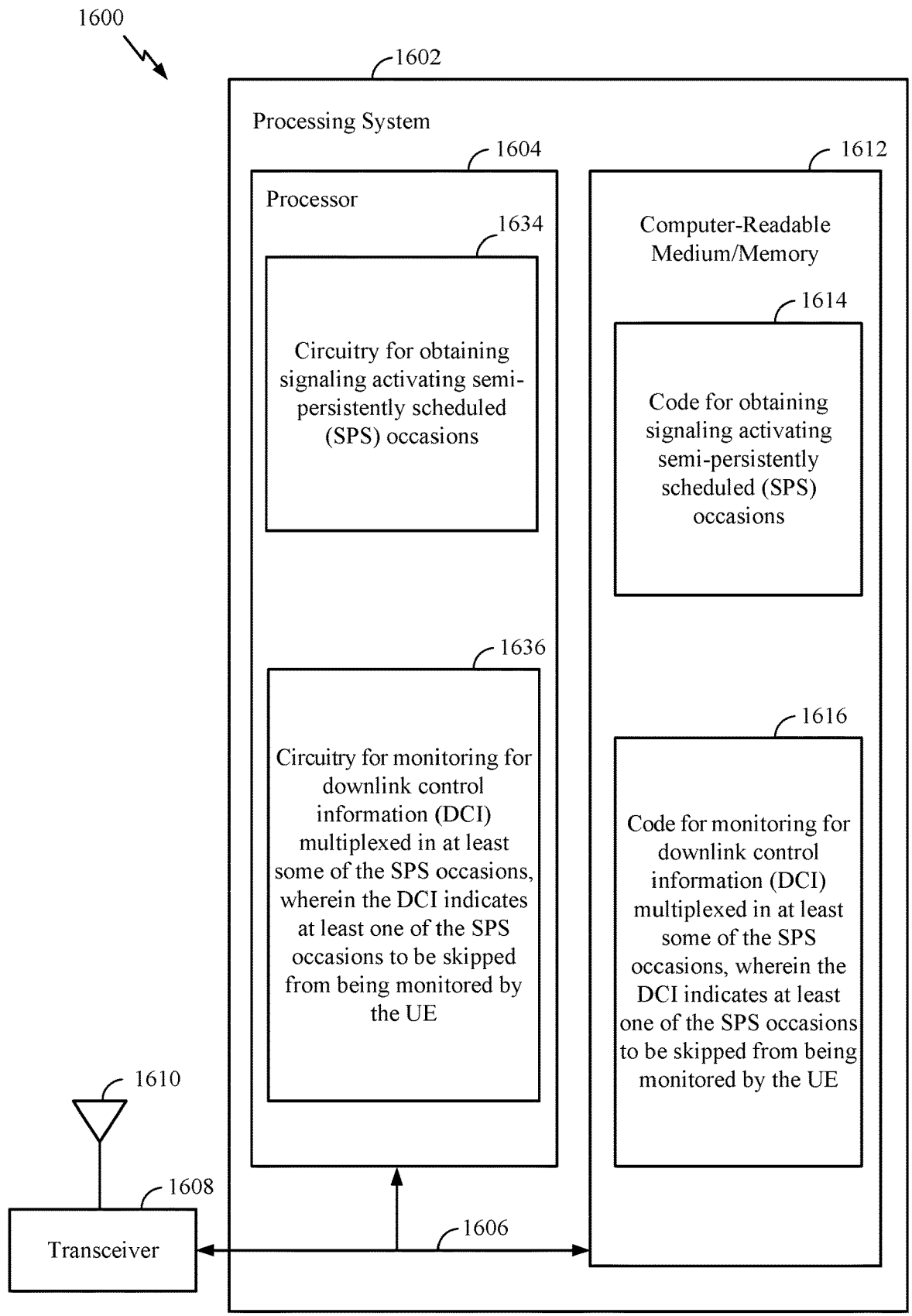
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations 900 illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations 900 illustrated in FIG. 9, or other operations for performing the various techniques discussed herein. In certain aspects, computer-readable medium/memory 1612 stores code 1614 for obtaining signaling activating semi-persistently scheduled (SPS) occasions; and code 1616 for monitoring for downlink control information (DCI) multiplexed in at least some of the SPS occasions, wherein the DCI indicates at least one of the SPS occasions to be skipped from being monitored by the UE. In certain aspects, the processor 1604 has circuitry configured to implement the code stored in the computer-readable medium/memory 1612. The processor 1604 includes circuitry 1634 for obtaining signaling activating semi-persistently scheduled (SPS) occasions; and circuitry 1636 for monitoring for downlink control information (DCI) multiplexed in at least some of the SPS occasions, wherein the DCI indicates at least one of the SPS occasions to be skipped from being monitored by the UE.

Figure 17:
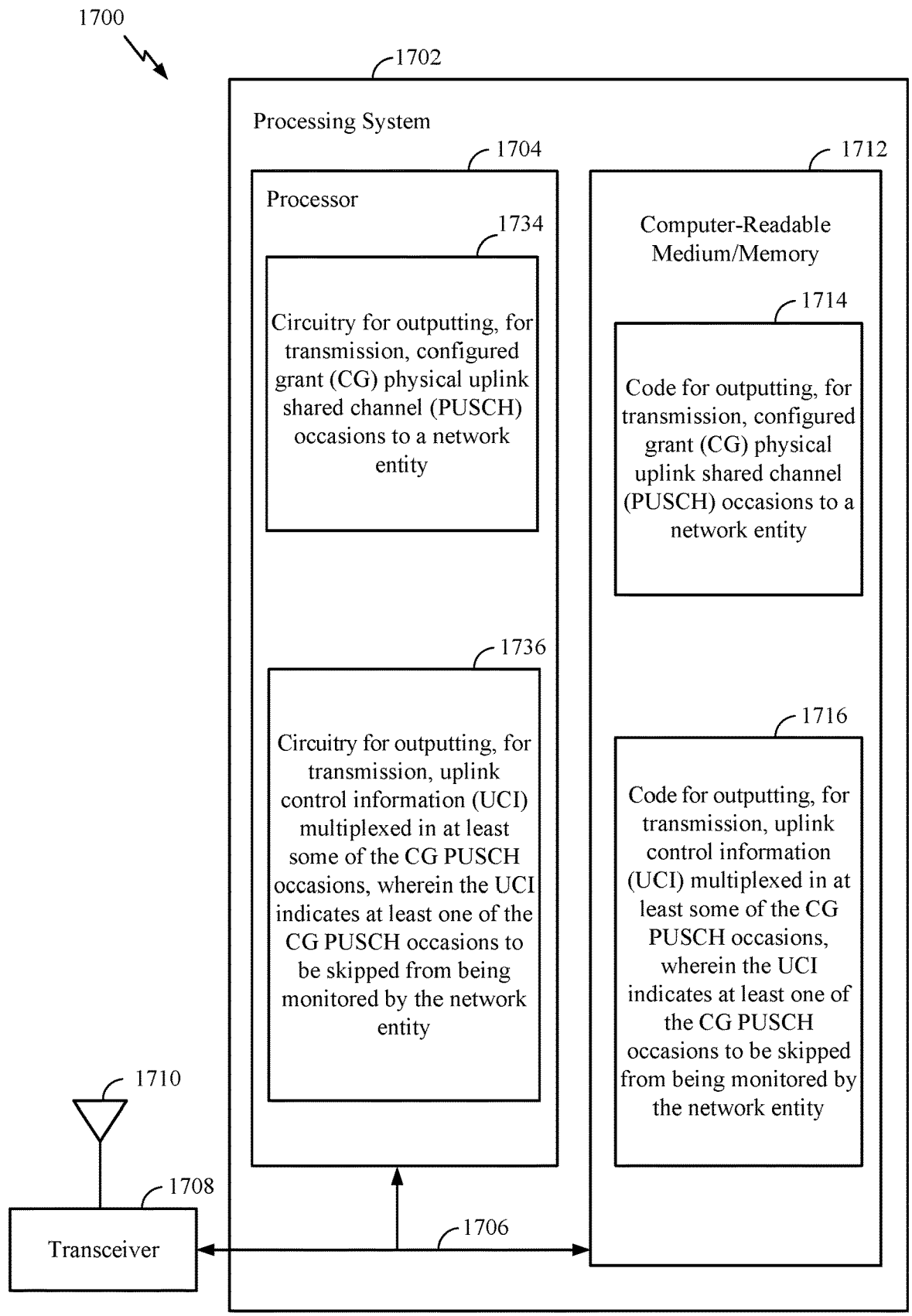
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations 1000 illustrated in FIG. 10. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations 1000 illustrated in FIG. 10, or other operations for performing the various techniques discussed herein. In certain aspects, computer-readable medium/memory 1712 stores code 1714 for outputting, for transmission, configured grant (CG) physical uplink shared channel (PUSCH) occasions to a network entity; and code 1716 for outputting, for transmission, uplink control information (UCI) multiplexed in at least some of the CG PUSCH occasions, wherein the UCI indicates at least one of the CG PUSCH occasions to be skipped from being monitored by the network entity. In certain aspects, the processor 1704 has circuitry configured to implement the code stored in the computer-readable medium/memory 1712. The processor 1704 includes circuitry 1734 for outputting, for transmission, CG PUSCH occasions to a network entity; and circuitry 1736 for outputting, for transmission, UCI multiplexed in at least some of the CG PUSCH occasions, wherein the UCI indicates at least one of the CG PUSCH occasions to be skipped from being monitored by the network entity.

Figure 18:
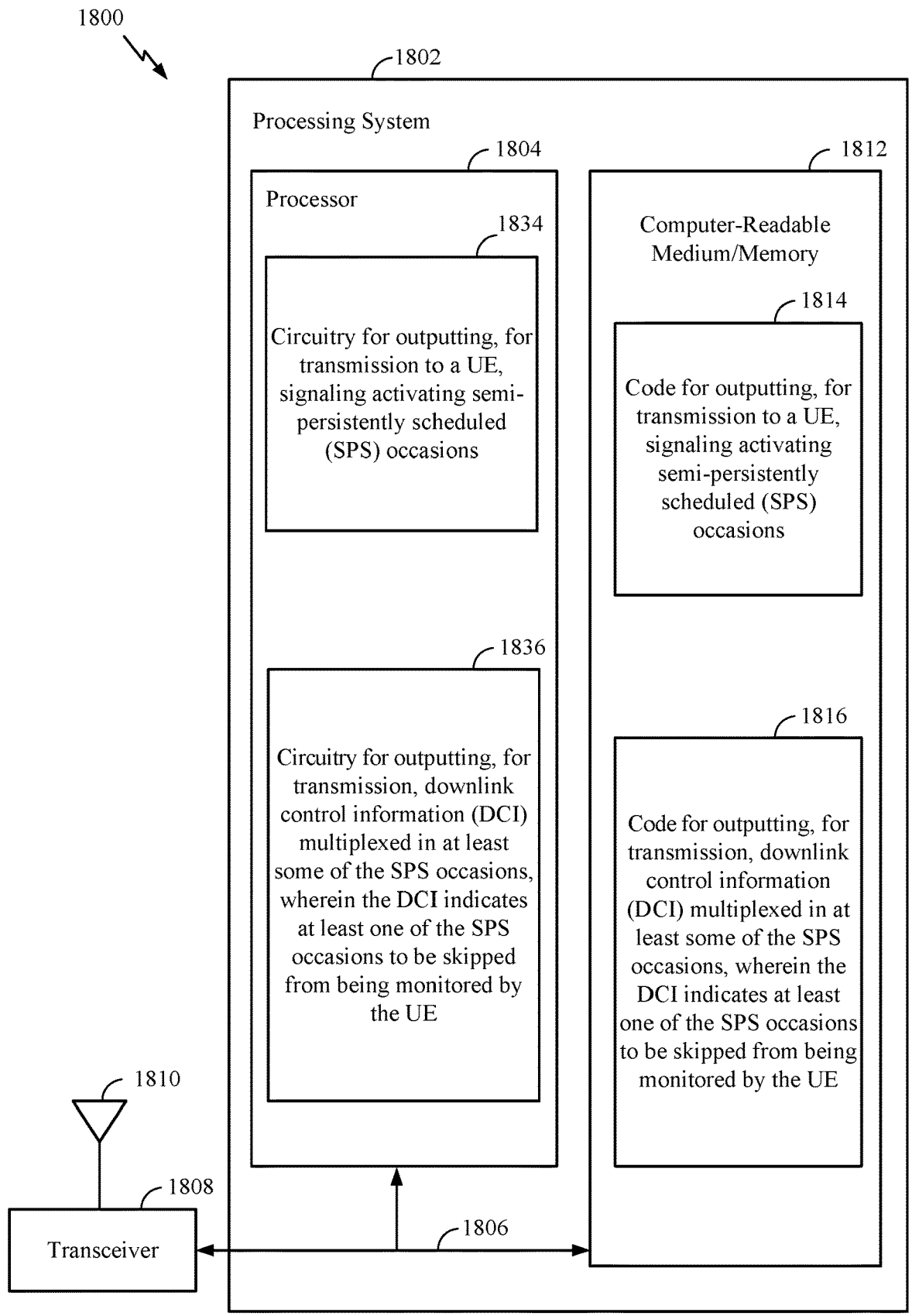
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations 1100 illustrated in FIG. 11. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations 1100 illustrated in FIG. 11, or other operations for performing the various techniques discussed herein. In certain aspects, computer-readable medium/memory 1812 stores code 1814 for outputting, for transmission to a UE, signaling activating semi-persistently scheduled (SPS) occasions; and code 1816 for transmitting downlink control information (DCI) multiplexed in at least some of the SPS occasions, wherein the DCI indicates at least one of the SPS occasions to be skipped from being monitored by the UE. In certain aspects, the processor 1804 has circuitry configured to implement the code stored in the computer-readable medium/memory 1812. The processor 1804 includes circuitry 1834 for outputting, for transmission to a UE, signaling activating SPS occasions; and circuitry 1836 for transmitting DCI multiplexed in at least some of the SPS occasions, wherein the DCI indicates at least one of the SPS occasions to be skipped from being monitored by the UE.

Figure 19:
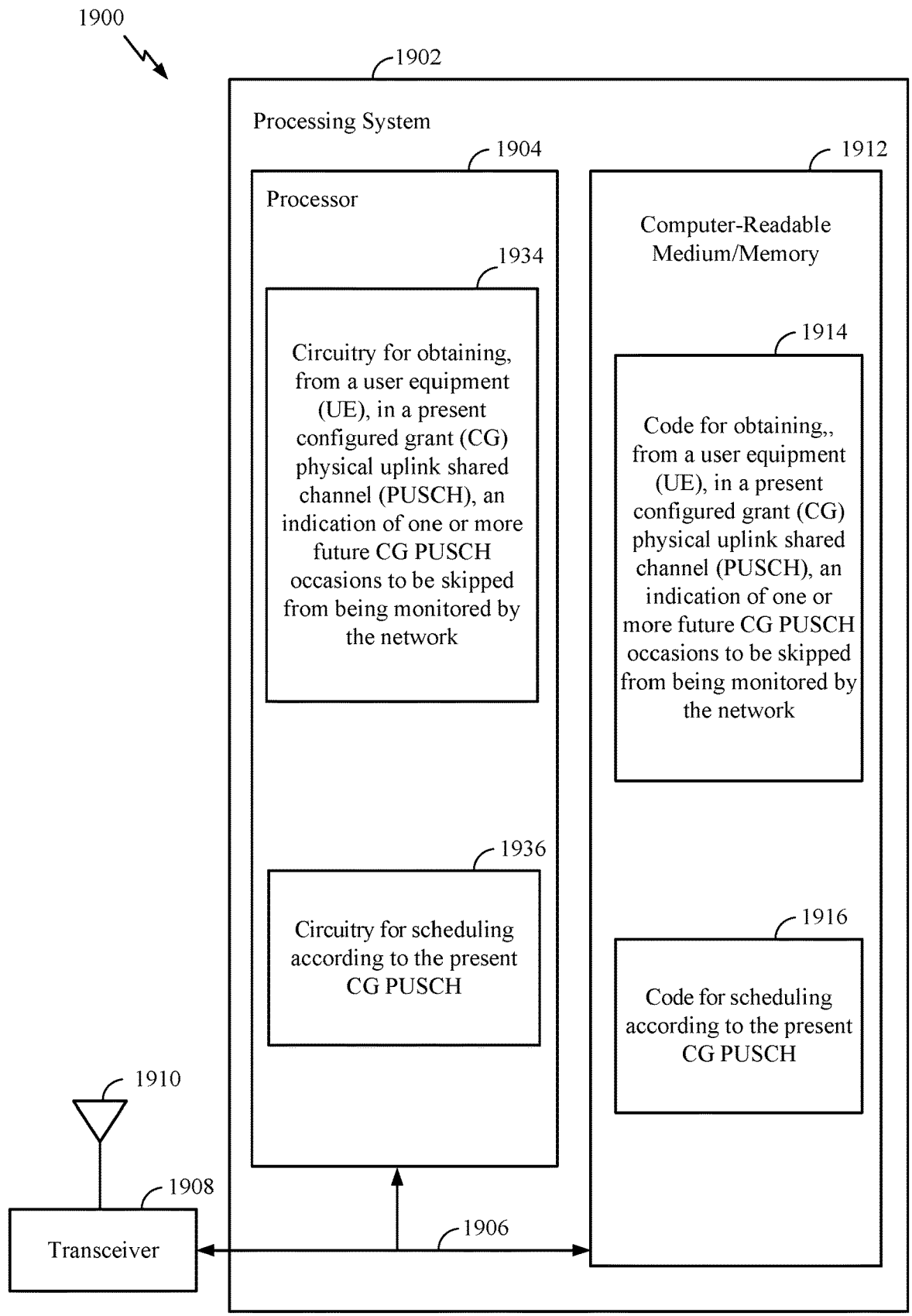
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations 1200 illustrated in FIG. 12. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations 1200 illustrated in FIG. 12, or other operations for performing the various techniques discussed herein. In certain aspects, computer-readable medium/memory 1912 stores code 1914 for obtaining, from a UE in a present configured grant (CG) physical uplink shared channel (PUSCH), an indication of one or more future CG PUSCH occasions to be skipped from being monitored by the network entity, and code 1916 for scheduling according to the present CG PUSCH. In certain aspects, the processor 1904 has circuitry configured to implement the code stored in the computer-readable medium/memory 1912. The processor 1904 includes circuitry 1934 for obtaining, from a UE in a present CG PUSCH, an indication of one or more future CG PUSCH occasions to be skipped from being monitored by the network entity; and circuitry 1936 for scheduling according to the present CG PUSCH.

In addition to the various aspects described above, aspects of specific combinations are within the scope of the disclosure, some of which are detailed below:

Aspect 1: A method for wireless communications by a user equipment (UE), comprising: receiving signaling activating semi-persistently scheduled (SPS) occasions; and monitoring for downlink control information (DCI) multiplexed in at least some of the SPS occasions, wherein the DCI indicates at least one of the SPS occasions to be skipped from being monitored by the UE.

Aspect 2: The method of Aspect 1, wherein the DCI indicates at least one of: a start location of the at least one SPS occasion to be skipped, or a number of the least one SPS occasion to be skipped.

Aspect 3: The method of any one of Aspects 1-2, wherein the DCI indicates the at least one SPS occasion to be skipped occurring between transmissions of a current physical downlink shared channel (PDSCH) and a next scheduled PDSCH by the DCI.

Aspect 4: The method of any one of Aspects 1-3, wherein the DCI is piggybacked in the current PDSCH.

Aspect 5: The method of any one of Aspects 1-3, wherein the DCI activates the indication of the at least one SPS occasion to be skipped via a radio resource control (RRC) message.

Aspect 6: The method of any one of Aspects 1-3, wherein the DCI activates the indication of the at least one SPS occasion to be skipped via a medium access control (MAC) control element (CE).

Aspect 7: The method of Aspects 1-6, wherein each of the SPS occasions has a periodicity equal to or less than 10 milliseconds.

Aspect 8: The method of Aspect 7, wherein the DCI includes a time domain resource allocation parameter associated with the current PDSCH and the periodicity of the each of the SPS occasions.

Aspect 9: A method for wireless communications by a user equipment (UE), comprising: transmitting configured grant (CG) physical uplink shared channel (PUSCH) occasions to a network entity; and transmitting uplink control information (UCI) multiplexed in at least some of the CG PUSCH occasions, wherein the UCI indicates at least one of the CG PUSCH occasions to be skipped from being monitored by the network entity.

Aspect 10: The method of Aspect 9, wherein the CG PUSCH occasions are transmitted over unlicensed spectrum.

Aspect 11: The method of any one of Aspects 9-10, further comprising signaling, in a demodulation reference signal (DMRS) sequence of at least some of the CG PUSCH occasions, an indication of one or more future CG PUSCH occasions.

Aspect 12: The method of any one of Aspects 9-11, wherein the DMRS sequence comprises different scrambling patterns.

Aspect 13: The method of Aspect 9, further comprising indicating the at least one CG PUSCH occasion to be skipped in a physical uplink control channel (PUCCH).

Aspect 14: The method of Aspect 9, further comprising indicating the at least one CG PUSCH occasion to be skipped in a medium access control (MAC) control element (CE).

Aspect 15: A method for wireless communications by a network entity, comprising: transmitting, to a UE, signaling activating semi-persistently scheduled (SPS) occasions; and transmitting downlink control information (DCI) multiplexed in at least some of the SPS occasions, wherein the DCI indicates at least one of the SPS occasions to be skipped from being monitored by the UE.

Aspect 16: The method of Aspect 15, wherein the DCI indicates at least one of: a start location of the at least one SPS occasion to be skipped, or a number of SPS occasions to be skipped.

Aspect 17: The method of any one of Aspects 15-16, wherein the at least one SPS occasion to be skipped is assigned to be used by one or more other UEs.

Aspect 18: The method of any one of Aspects 15-17, wherein the DCI indicates the at least one SPS occasion to be skipped occurring between transmissions of a current physical downlink shared channel (PDSCH) and a next scheduled PDSCH.

Aspect 19: The method of Aspect 18, wherein the DCI is piggybacked in the current PDSCH.

Aspect 20: The method of Aspect 18, wherein the DCI activates the indication of the at least one SPS occasion to be skipped via a radio resource control (RRC) message.

Aspect 21: The method of Aspect 18, wherein the DCI activates the indication of the at least one SPS occasion to be skipped via a medium access control (MAC) control element (CE).

Aspect 22: The method of Aspect 15 or 18, wherein each of the SPS occasions has a periodicity equal to or less than 10 milliseconds.

Aspect 23: The method of Aspect 22, wherein the DCI includes a time domain resource allocation parameter associated with the current PDSCH and the periodicity of the each of the SPS occasions.

Aspect 24: A method for wireless communications by a network entity, comprising: receiving, from a user equipment (UE), in a present configured grant (CG) physical uplink shared channel (PUSCH), an indication of one or more future CG PUSCH occasions to be skipped from being monitored by the network; and scheduling according to the present CG PUSCH.

Aspect 25: The method of Aspect 24, wherein the present CG PUSCH further comprises an uplink control information (UCI) multiplexed thereon to indicate the one or more future CG PUSCH occasions for the network entity to skip from monitoring.

Aspect 26: The method of any one of Aspects 24-25, wherein the present CG PUSCH is transmitted in unlicensed spectrum.

Aspect 27: The method of any one of Aspects 24-26, wherein the indication of one or more future CG PUSCH occasions to be skipped is signaled in a demodulation reference signal (DMRS) sequence of the present CG PUSCH.

Aspect 28: The method of Aspect 27, wherein the DMRS sequence comprises different scrambling patterns.

Aspect 29: The method of Aspect 24, further comprising receiving a physical uplink control channel (PUCCH), the PUCCH indicating the one or more future CG PUSCH occasions.

Aspect 30: The method of Aspect 24, further comprising receiving a medium access control (MAC) control element (CE), the MAC CE indicating the one or more future CG PUSCH occasions.

Aspect 31: A user equipment (UE), comprising: means for receiving signaling activating semi-persistently scheduled (SPS) occasions; and means for monitoring for downlink control information (DCI) multiplexed in at least some of the SPS occasions, wherein the DCI indicates at least one of the SPS occasions to be skipped from being monitored by the UE.

Aspect 32: The UE of Aspect 31, wherein the DCI indicates at least one of: a start location of the at least one SPS occasion to be skipped, or a number of the least one SPS occasion to be skipped.

Aspect 33: The UE of any one of Aspects 31-32, wherein the DCI indicates the at least one SPS occasion to be skipped occurring between transmissions of a current physical downlink shared channel (PDSCH) and a next scheduled PDSCH by the DCI.

Aspect 34: The UE of Aspect 33, wherein the DCI is piggybacked in the current PDSCH.

Aspect 35: The UE of Aspect 33, wherein the DCI activates the indication of the at least one SPS occasion to be skipped via a radio resource control (RRC) message.

Aspect 36: The UE of Aspect 33, wherein the DCI activates the indication of the at least one SPS occasion to be skipped via a medium access control (MAC) control element (CE).

Aspect 37: The UE of any one of Aspects 31-36, wherein each of the SPS occasions has a periodicity equal to or less than 10 milliseconds.

Aspect 38: The UE of Aspect 37, wherein the DCI includes a time domain resource allocation parameter associated with the current PDSCH and the periodicity of the each of the SPS occasions.

Aspect 39: A user equipment (UE), comprising: means for transmitting configured grant (CG) physical uplink shared channel (PUSCH) occasions to a network entity; and means for transmitting uplink control information (UCI) multiplexed in at least some of the CG PUSCH occasions, wherein the UCI indicates at least one of the CG PUSCH occasions to be skipped from being monitored by the network entity.

Aspect 40: The UE of Aspect 39, wherein the CG PUSCH occasions are transmitted over unlicensed spectrum.

Aspect 41: The UE of Aspect 40, further comprising means for signaling, in a demodulation reference signal (DMRS) sequence of at least some of the CG PUSCH occasions, an indication of one or more future CG PUSCH occasions.

Aspect 42: The UE of Aspect 41, wherein the DMRS sequence comprises different scrambling patterns.

Aspect 43: The UE of any one of Aspects 39-42, further comprising means for indicating the at least one CG PUSCH occasion to be skipped in a physical uplink control channel (PUCCH).

Aspect 44: The UE of any one of Aspects 39-43, further comprising means for indicating the at least one CG PUSCH occasion to be skipped in a medium access control (MAC) control element (CE).

Aspect 45: A network entity, comprising: means for transmitting, to a UE, signaling activating semi-persistently scheduled (SPS) occasions; and means for transmitting downlink control information (DCI) multiplexed in at least some of the SPS occasions, wherein the DCI indicates at least one of the SPS occasions to be skipped from being monitored by the UE.

Aspect 46: The network entity of Aspect 45, wherein the DCI indicates at least one of: a start location of the at least one SPS occasion to be skipped, or a number of SPS occasions to be skipped.

Aspect 47: The network entity of any one of Aspects 45-46, wherein the at least one SPS occasion to be skipped is assigned to be used by one or more other UEs.

Aspect 48: The network entity of any one of Aspects 45-47, wherein the DCI indicates the at least one SPS occasion to be skipped occurring between transmissions of a current physical downlink shared channel (PDSCH) and a next scheduled PDSCH.

Aspect 49: The network entity of Aspect 48, wherein the DCI is piggybacked in the current PDSCH.

Aspect 50: The network entity of Aspect 48, wherein the DCI activates the indication of the at least one SPS occasion to be skipped via a radio resource control (RRC) message.

Aspect 51: The network entity of Aspect 48, wherein the DCI activates the indication of the at least one SPS occasion to be skipped via a medium access control (MAC) control element (CE).

Aspect 52: The network entity of any one of Aspects 45-51, wherein each of the SPS occasions has a periodicity equal to or less than 10 milliseconds.

Aspect 53: The network entity of Aspect 52, wherein the DCI includes a time domain resource allocation parameter associated with the current PDSCH and the periodicity of the each of the SPS occasions.

Aspect 54: A network entity, comprising: means for receiving, from a user equipment (UE), in a present configured grant (CG) physical uplink shared channel (PUSCH), an indication of one or more future CG PUSCH occasions to be skipped from being monitored by the network; and means for scheduling according to the present CG PUSCH.

Aspect 55: The network entity of Aspect 54, wherein the present CG PUSCH further comprises an uplink control information (UCI) multiplexed thereon to indicate the one or more future CG PUSCH occasions for the network entity to skip from monitoring.

Aspect 56: The network entity of Aspect 55, wherein the present CG PUSCH is transmitted in unlicensed spectrum.

Aspect 57: The network entity of Aspect 55, wherein the indication of one or more future CG PUSCH occasions to be skipped is signaled in a demodulation reference signal (DMRS) sequence of the present CG PUSCH.

Aspect 58: The network entity of Aspect 57, wherein the DMRS sequence comprises different scrambling patterns.

Aspect 59: The network entity of any one of Aspects 54-58, further comprising means for receiving a physical uplink control channel (PUCCH), the PUCCH indicating the one or more future CG PUSCH occasions.

Aspect 60: The network entity of any one of Aspects 54-59, further comprising means for receiving a medium access control (MAC) control element (CE), the MAC CE indicating the one or more future CG PUSCH occasions.

Aspect 61: A user equipment (UE), comprising: a receiver configured to receive signaling activating semi-persistently scheduled (SPS) occasions; and a processing system configured to monitor for downlink control information (DCI) multiplexed in at least some of the SPS occasions, wherein the DCI indicates at least one of the SPS occasions to be skipped from being monitored by the UE.

Aspect 62: The UE of Aspect 61, wherein the DCI indicates at least one of: a start location of the at least one SPS occasion to be skipped, or a number of the least one SPS occasion to be skipped.

Aspect 63: The UE of any one of Aspects 61-62, wherein the DCI indicates the at least one SPS occasion to be skipped occurring between transmissions of a current physical downlink shared channel (PDSCH) and a next scheduled PDSCH by the DCI.

Aspect 64: The UE of Aspect 63, wherein the DCI is piggybacked in the current PDSCH.

Aspect 65: The UE of Aspect 63, wherein the DCI activates the indication of the at least one SPS occasion to be skipped via a radio resource control (RRC) message.

Aspect 66: The UE of Aspect 63, wherein the DCI activates the indication of the at least one SPS occasion to be skipped via a medium access control (MAC) control element (CE).

Aspect 67: The UE of any one of Aspects 61-66, wherein each of the SPS occasions has a periodicity equal to or less than 10 milliseconds.

Aspect 68: The UE of Aspect 67, wherein the DCI includes a time domain resource allocation parameter associated with the current PDSCH and the periodicity of the each of the SPS occasions.

Aspect 69: A user equipment (UE), comprising a transmitter configured to: transmit configured grant (CG) physical uplink shared channel (PUSCH) occasions to a network entity; and transmit uplink control information (UCI) multiplexed in at least some of the CG PUSCH occasions, wherein the UCI indicates at least one of the CG PUSCH occasions to be skipped from being monitored by the network entity.

Aspect 70: The UE of Aspect 69, wherein the CG PUSCH occasions are transmitted over unlicensed spectrum.

Aspect 71: The UE of Aspect 70, further comprising a processing system configured to signal, in a demodulation reference signal (DMRS) sequence of at least some of the CG PUSCH occasions, an indication of one or more future CG PUSCH occasions.

Aspect 72: The UE of Aspect 71, wherein the DMRS sequence comprises different scrambling patterns.

Aspect 73: The UE of any one of Aspects 69-72, wherein the processing system is further configured to indicate the at least one CG PUSCH occasion to be skipped in a physical uplink control channel (PUCCH).

Aspect 74: The UE of any one of Aspects 69-73, wherein the processing system is further configured to indicate the at least one CG PUSCH occasion to be skipped in a medium access control (MAC) control element (CE).

Aspect 75: A network entity, comprising a transmitter configured to:
transmit, to a UE, signaling activating semi-persistently scheduled (SPS) occasions; and transmit downlink control information (DCI) multiplexed in at least some of the SPS occasions, wherein the DCI indicates at least one of the SPS occasions to be skipped from being monitored by the UE.

Aspect 76: The network entity of Aspect 75, wherein the DCI indicates at least one of: a start location of the at least one SPS occasion to be skipped, or a number of SPS occasions to be skipped.

Aspect 77: The network entity of any one of Aspects 75-76, wherein the at least one SPS occasion to be skipped is assigned to be used by one or more other UEs.

Aspect 78: The network entity of any one of Aspects 75-77, wherein the DCI indicates the at least one SPS occasion to be skipped occurring between transmissions of a current physical downlink shared channel (PDSCH) and a next scheduled PDSCH.

Aspect 79: The network entity of Aspect 78, wherein the DCI is piggybacked in the current PDSCH.

Aspect 80: The network entity of Aspect 78, wherein the DCI activates the indication of the at least one SPS occasion to be skipped via a radio resource control (RRC) message.

Aspect 81: The network entity of Aspect 78, wherein the DCI activates the indication of the at least one SPS occasion to be skipped via a medium access control (MAC) control element (CE).

Aspect 82: The network entity of any one of Aspects 75-81, wherein each of the SPS occasions has a periodicity equal to or less than 10 milliseconds.

Aspect 83: The network entity of Aspect 82, wherein the DCI includes a time domain resource allocation parameter associated with the current PDSCH and the periodicity of the each of the SPS occasions.

Aspect 84: A network entity, comprising: a receiver configured to receive, from a user equipment (UE), in a present configured grant (CG) physical uplink shared channel (PUSCH), an indication of one or more future CG PUSCH occasions to be skipped from being monitored by the network; and a processing system configured to schedule according to the present CG PUSCH.

Aspect 85: The network entity of Aspect 84, wherein the present CG PUSCH further comprises an uplink control information (UCI) multiplexed thereon to indicate the one or more future CG PUSCH occasions for the network entity to skip from monitoring.

Aspect 86: The network entity of Aspect 85, wherein the present CG PUSCH is transmitted in unlicensed spectrum.

Aspect 87: The network entity of Aspect 85, wherein the indication of one or more future CG PUSCH occasions to be skipped is signaled in a demodulation reference signal (DMRS) sequence of the present CG PUSCH.

Aspect 88: The network entity of Aspect 87, wherein the DMRS sequence comprises different scrambling patterns.

Aspect 89: The network entity of any one of Aspects 84-88, wherein the receiver is further configured to receive a physical uplink control channel (PUCCH), the PUCCH indicating the one or more future CG PUSCH occasions.

Aspect 90: The network entity of any one of Aspects 84-89, wherein the receiver is further configured to receive a medium access control (MAC) control element (CE), the MAC CE indicating the one or more future CG PUSCH occasions.

Aspect 91: An apparatus for wireless communications by a user equipment (UE), comprising: an interface configured to obtain signaling activating semi-persistently scheduled (SPS) occasions; and a processing system configured to monitor for downlink control information (DCI) multiplexed in at least some of the SPS occasions, wherein the DCI indicates at least one of the SPS occasions to be skipped from being monitored by the UE.

Aspect 92: An apparatus for wireless communications by a user equipment (UE), comprising an interface configured to: output, for transmission, configured grant (CG) physical uplink shared channel (PUSCH) occasions to a network entity; and output, for transmission, uplink control information (UCI) multiplexed in at least some of the CG PUSCH occasions, wherein the UCI indicates at least one of the CG PUSCH occasions to be skipped from being monitored by the network entity.

Aspect 93: An apparatus for wireless communications by a network entity, comprising an interface configured to: output, for transmission to a UE, signaling activating semi-persistently scheduled (SPS) occasions; and output, for transmission, downlink control information (DCI) multiplexed in at least some of the SPS occasions, wherein the DCI indicates at least one of the SPS occasions to be skipped from being monitored by the UE.

Aspect 94: An apparatus for wireless communications by a network entity, comprising: an interface configured to obtain, from a user equipment (UE), in a present configured grant (CG) physical uplink shared channel (PUSCH), an indication of one or more future CG PUSCH occasions to be skipped from being monitored by the network; and a processing system configured to schedule according to the present CG PUSCH.

Aspect 95: A computer-readable medium for wireless communications by a user equipment (UE), comprising codes executable to: obtain signaling activating semi-persistently scheduled (SPS) occasions; and monitor for downlink control information (DCI) multiplexed in at least some of the SPS occasions, wherein the DCI indicates at least one of the SPS occasions to be skipped from being monitored by the UE.

Aspect 96: A computer-readable medium for wireless communications by a user equipment (UE), comprising codes executable to: output, for transmission, configured grant (CG) physical uplink shared channel (PUSCH) occasions to a network entity; and output, for transmission, uplink control information (UCI) multiplexed in at least some of the CG PUSCH occasions, wherein the UCI indicates at least one of the CG PUSCH occasions to be skipped from being monitored by the network entity.

Aspect 97: A computer-readable medium for wireless communications by a network entity, comprising codes executable to: output, for transmission to a UE, signaling activating semi-persistently scheduled (SPS) occasions; and output, for transmission, downlink control information (DCI) multiplexed in at least some of the SPS occasions, wherein the DCI indicates at least one of the SPS occasions to be skipped from being monitored by the UE.

Aspect 98: A computer-readable medium for wireless communications by a network entity, comprising codes executable to: obtain, from a user equipment (UE), in a present configured grant (CG) physical uplink shared channel (PUSCH), an indication of one or more future CG PUSCH occasions to be skipped from being monitored by the network; and schedule according to the present CG PUSCH.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 458, 464 and 466, and/or controller/processor 480 of the UE 120 and/or processors 420, 430, 438, and/or controller/processor 440 of the BS 110 shown in FIG. 4 may be configured to perform operations 1600 of FIG. 16, operations 1700 of FIG. 17, operations 1800 of FIG. 18 and/or operations 1900 of FIG. 19.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for monitoring, means for signaling, means for indicating, and means for scheduling may include a processing system, which may include one or more processors, such as processors 458, 464 and 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving signaling activating semi-persistently scheduled (SPS) occasions; and
   monitoring for downlink control information (DCI) multiplexed in at least some of the SPS occasions, wherein the DCI indicates two or more of the SPS occasions to be skipped from being monitored by the UE, and wherein the DCI indicates a number of the two or more SPS occasions to be skipped, wherein the DCI further indicates at least one of the two or more SPS occasions to be skipped occurring between transmissions of a current physical downlink shared channel (PDSCH) and a next scheduled PDSCH by the DCI.

2. The method of claim 1, wherein the DCI further indicates a start location of at least one of the two or more SPS occasions to be skipped.

3. The method of claim 1, wherein the DCI is piggybacked in the current PDSCH.

4. The method of claim 1, wherein the DCI activates the indication of the two or more SPS occasions to be skipped via a radio resource control (RRC) message.

5. The method of claim 1, wherein the DCI activates the indication of the two or more SPS occasions to be skipped via a medium access control (MAC) control element (CE).

6. The method of claim 1, wherein each of the SPS occasions has a periodicity equal to or less than 10 milliseconds.

7. The method of claim 6, wherein the DCI includes a time domain resource allocation parameter associated with the current PDSCH and the periodicity of the each of the SPS occasions.

8. A method for wireless communications by a network entity, comprising:
   transmitting, to a UE, signaling activating semi-persistently scheduled (SPS) occasions; and
   transmitting downlink control information (DCI) multiplexed in at least some of the SPS occasions, wherein the DCI indicates two or more of the SPS occasions to be skipped from being monitored by the UE, and wherein the DCI indicates a number of the two or more SPS occasions to be skipped, wherein the DCI further indicates at least one of the two or more SPS occasions to be skipped occurring between transmissions of a current physical downlink shared channel (PDSCH) and a next scheduled PDSCH.

9. The method of claim 8, wherein the DCI further indicates a start location of at least one of the two or more SPS occasions to be skipped.

10. The method of claim 8, wherein at least one of the two or more SPS occasions to be skipped is assigned to be used by one or more other UEs.

11. The method of claim 8, wherein the DCI is piggybacked in the current PDSCH.

12. The method of claim 8, wherein the DCI activates the indication of the two or more SPS occasions to be skipped via a radio resource control (RRC) message.

13. The method of claim 8, wherein the DCI activates the indication of the two or more SPS occasions to be skipped via a medium access control (MAC) control element (CE).

14. The method of claim 8, wherein each of the SPS occasions has a periodicity equal to or less than 10 milliseconds.

15. The method of claim 14, wherein the DCI includes a time domain resource allocation parameter associated with the current PDSCH and the periodicity of the each of the SPS occasions.

16. An apparatus for wireless communications, comprising:
   a memory comprising executable instructions; and
   one or more processors configured to execute the instructions to cause the apparatus to perform a method comprising:
   receiving signaling activating semi-persistently schedule (SPS) occasions; and
   monitoring for downlink control information (DCI) multiplexed in at least some of the SPS occasions, wherein the DCI indicates two or more of the SPS occasions to be skipped from being monitored by the apparatus, and wherein the DCI indicates a number of the two or more SPS occasions to be skipped, wherein the DCI further indicates at least one of the two or more SPS occasions to be skipped occurring between transmissions of a current physical downlink shared channel (PDSCH) and a next scheduled PDSCH by the DCI.

17. The apparatus of claim 16, wherein the DCI further indicates a start location of at least one of the two or more SPS occasions to be skipped.

18. The apparatus of claim 16, wherein the DCI is piggybacked in the current PDSCH.

19. The apparatus of claim 16, wherein the DCI activates the indication of the two or more SPS occasion to be skipped via a radio resource control (RRC) message.

20. The apparatus of claim 16, wherein the DCI activates the indication of the two or more SPS occasions to be skipped via a medium access control (MAC) control element (CE).

21. The apparatus of claim 16, wherein each of the SPS occasions has a periodicity equal to or less than 10 milliseconds.

22. The apparatus of claim 21, wherein the DCI includes a time domain resource allocation parameter associated with the current PDSCH and the periodicity of the each of the SPS occasions.

23. An apparatus for wireless communications, comprising:

a memory comprising executable instructions; and
one or more processors configured to execute the instructions to cause the apparatus to perform a method comprising:
transmitting, to a UE, signaling activating semi-persistently schedule (SPS) occasions; and
transmitting downlink control information (DCI) multiplexed in at least some of the SPS occasions, wherein the DCI indicates two or more of the SPS occasions to be skipped from being monitored by the UE, and wherein the DCI indicates a number of the two or more SPS occasions to be skipped, wherein the DCI further indicates at least one of the two or more SPS occasions to be skipped occurring between transmissions of a current physical downlink shared channel (PDSCH) and a next scheduled PDSCH.

24. The apparatus of claim 23, wherein at least one of the two or more SPS occasions to be skipped is assigned to be used by one or more other UEs.

25. The apparatus of claim 23, wherein the DCI is piggybacked in the current PDSCH.

26. The apparatus of claim 23, wherein the DCI activates the indication of the two or more SPS occasions to be skipped via a radio resource control (RRC) message.

* * * * *